(12) United States Patent
Ikedo et al.

(10) Patent No.: US 6,680,882 B2
(45) Date of Patent: Jan. 20, 2004

(54) SYSTEM FOR REPRODUCING A DISC

(75) Inventors: Yuji Ikedo, Saitama-ken (JP); Yoshimitsu Fukushima, Saitama-ken (JP); Hitoshi Nagata, Saitama-ken (JP); Atsushi Yamane, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 368 days.

(21) Appl. No.: 09/207,333

(22) Filed: Dec. 8, 1998

(65) Prior Publication Data

US 2002/0009042 A1 Jan. 24, 2002

(30) Foreign Application Priority Data

Dec. 17, 1997 (JP) .............................................. 9-348093
Jul. 21, 1998 (JP) ............................................ 10-205197

(51) Int. Cl.⁷ .............................................. G11B 17/24
(52) U.S. Cl. ................. 369/30.8; 369/30.91; 369/30.86
(58) Field of Search .......................... 369/37, 36, 30.79, 369/30.86, 30.91, 30.8, 30.87

(56) References Cited

U.S. PATENT DOCUMENTS

| 4,609,232 A | | 9/1986 | Florence ...................... 312/16 |
| 4,791,626 A | * | 12/1988 | Staar ............................ 369/37 |
| 4,815,057 A | * | 3/1989 | Miller et al. ................... 369/37 |
| 5,031,779 A | * | 7/1991 | Szenay et al. ................. 211/40 |
| 5,528,566 A | * | 6/1996 | McGee et al. ................. 369/37 |
| 5,777,958 A | * | 7/1998 | Matumoto et al. ............ 369/37 |
| 5,848,035 A | * | 12/1998 | Nakao .......................... 369/37 |
| 5,953,293 A | * | 9/1999 | Kajiyama et al. ............. 369/37 |
| 5,978,324 A | * | 11/1999 | Inatani et al. ................. 369/37 |
| 6,084,833 A | * | 7/2000 | Ohkawara et al. ............ 369/37 |
| 6,169,713 B1 | * | 1/2001 | Silverstein .................... 369/37 |

FOREIGN PATENT DOCUMENTS

| WO | 87/07423 | 12/1987 |
| WO | 91/14264 | 9/1991 |

* cited by examiner

Primary Examiner—Brian E. Miller
(74) Attorney, Agent, or Firm—Arent Fox Kintner Plotkin & Kahn, PLLC

(57) ABSTRACT

An annular disc holder is provided for holding a plurality of discs. The disc holder is rotatably mounted on a base and is guided by a guiding device provided between the disc holder and the base so as to be rotated about an axis.

7 Claims, 28 Drawing Sheets

FIG.24 a    FIG.24 b    FIG.24 c
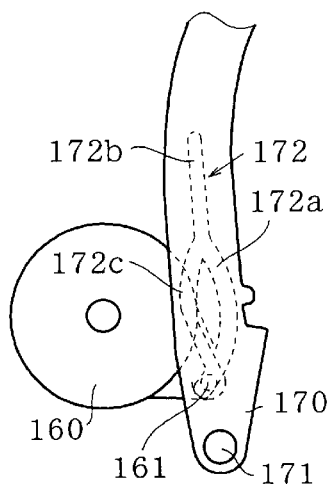 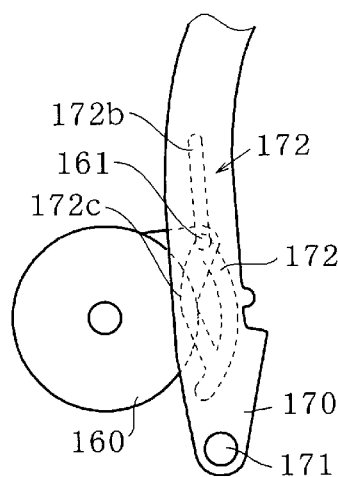 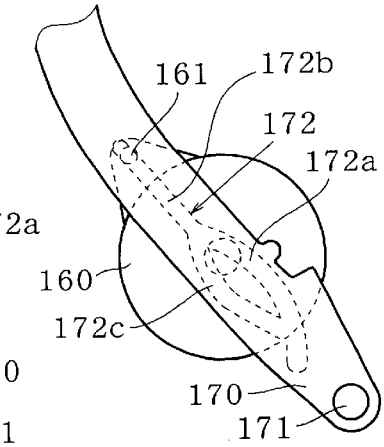
FIG.24 d
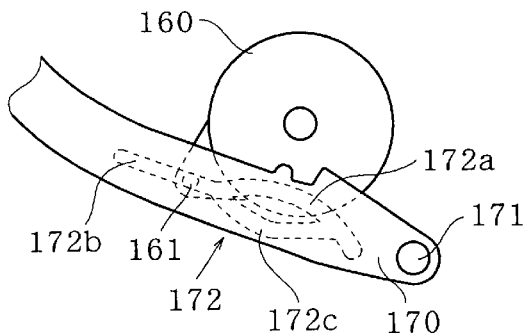
FIG.24 e
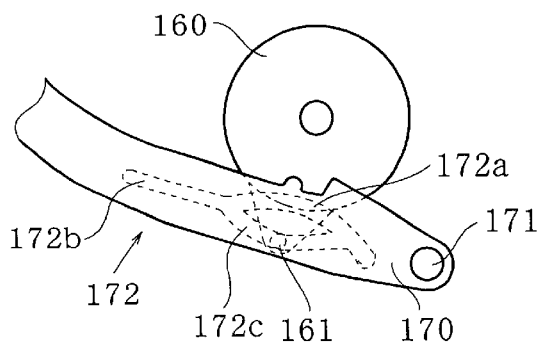

SYSTEM FOR REPRODUCING A DISC

BACKGROUND OF THE INVENTION

The present invention relates to a system for reproducing a disc.

A disc reproducing system having an automatic disc changer has recently become popular. The disc reproducing system is provided with a rack wherein a large number of CDs are stored so as to improve the storing efficiency of the CDs.

FIG. 26 is a perspective view of such a reproducing system disclosed in Japanese Patent Laid Open 9-223351 which has been filed by the present patent applicant.

FIGS. 27 and 28 show another reproducing system disclosed in Japanese Patent Laid Open 59-104759.

The system of FIG. 24 will be described firstly. A disc reproducing system is provided with a roulette device 3 mounted on a chassis base 2 in a housing. The housing comprises the chassis base 2, casing 8, rear panel 9 and the front operation panel 10. The roulette device 3 comprises a base 3a, rack base 3b having a spindle 3c and a center pole 5 mounted on the spindle 3c, and five rotary circular racks 4a, 4b, 4c, 4d and 4e, each having a center hole 4 in which the center pole 5 is engaged. Hence, all of the racks 4a to 4e are securely mounted on the center pole 5 in a tiered formation.

In each of the racks 4a to 4e, there is formed radial slits 40 in each of which a recording medium D such as CD can be stored. A radial recess 41 through which a disc player 7 provided adjacent the racks 4a to 4e passes is further formed in each of the racks 4a to 4e at a predetermined circumferential position. In the player 7, an arm 7a is provided for taking out one of recording mediums D. The arm 7a is operated by a driving device (not shown) upon loading and ejecting of the recording mediums D into and out of the disc player 7 thereby passing through one of the slits 40 of the rack from the underneath thereof.

The front operation panel 10 is provided with an opening 10a through which the recording mediums D is inserted and taken out. The opening 10a is covered by a door 6 having a pin 6a projected downward from the top. The pin 6a engaged with the upper end of the center pole 5 so that the door 6 is rotatably mounted thereon. The door 6 is rotated on the pole 5 in the counterclockwise direction to disclose the racks 4a to 4e through the opening 10a.

On the underside of the rack 4a, an encoder (not shown) and photo sensors are provided for detecting position of a desired recording mediums on one of the racks 4a to 4e.

When a select button on the operation panel 10 is operated to select a desired recording mediums, the racks 4a to 4e are rotated and stored at an angular position where the desired recording medium is stored. The disc player 7 is vertically moved to the position of one of racks where the recording medium is stored. The arm 7a takes out the recording medium and loads it on the disc player 7, thereby reproducing the recording medium.

Referring to FIGS. 27 and 28, an annular storing base 12 is rotatably provided in a frame 11 and rotated by a rotating device 13. On the storing base 12, a plurality of recording mediums D are stored. An information reading and writing device 15 and an arm driving device 17 for driving an arm 16 are mounted on a holding base 14. A guide 15a is provided for guiding the recording medium D. An opening 18 is formed for inserting the recording medium D. The arm 16 has pawls 16a and is driven by a screw 19.

When a desired recording medium D is selected, the storing base 12 is rotated so that the selected recording medium is positioned at the opening 18 of the information reading and writing device 15. Then, the arm 16 is moved in the direction X by the arm driving device 17, and inserts the recording medium D into the device 15. The recording medium D is located at a position d shown by dotted lines. At the position, the information is read and written.

Thereafter, the information reading and writing device 15 moves the recording medium D to a position where a part of recording medium D is projected from the opening 18.

A detector (not shown) mounted on the arm 16 detects whether the recording medium D contacts with the arm 16 or not. If contacts, the pawls 16a are moved in the direction Y in FIG. 27 by solenoids (not shown) to grip the recording medium D. If does not contact, the arm 16 is moved in the direction X until contacts. Then, the arm 16 is moved in the direction X' so that the recording medium D is returned to the storing base 12, and hence the sequential operation is completed.

FIG. 29 shows an example of a rotating mechanism of the disc reproducing system. In the rotating mechanism 20, a shaft 22 is secured to a frame 21 at the upper end thereof, and to a base 23 at the lower end thereof. On the shaft 22, a disc holder 24 is rotatably mounted. A plurality of discs D are radially arranged and supported on a disc receiver 24a of the disc holder 24.

The disc holder 24 has a toothed periphery 24b with which a pinion 25 is engaged.

The disc holder 24 is rotated by a motor through the pinion 25 so as to position a selected disc to a reproducing device (not shown).

In the system of FIG. 26, it is necessary to provide a device for preventing the center pole 5 from vibrating. If the center pole 5 vibrates, the position of the desired disc may not be exactly detected.

In the system shown in FIGS. 27 and 28, it is also necessary to provide a vibration preventing device of the rotating device 13 in order to exactly load a disc. However, it is difficult to provide such a device for the rotating device 13.

The device of FIG. 29 has following problems.

(1) In the rotating device 20 having five degrees of freedom at the shaft 22 and one degree of freedom at the pinion 25, it is important that the shaft 22 is kept vertical, because the vibration of the shaft causes the peripheral position to largely fluctuate.

(2) Since the driving pinion 25 having a small diameter engages with teeth of disc holder having a large diameter, there is a case where the pitch of the teeth changes about 0.8 mm by change of ambient temperature.

(3) The deflection of the disc holder renders the operation relative to the driving mechanism including the driving pinion 25 defective.

(4) Since the shaft 22 is disposed in the center of the disc holder 24, no devices can be provided in the central portion of the disc holder.

In order to resolve above described problems, a rotating mechanism 20' shown in FIG. 30 has been proposed.

The rotating mechanism 20' comprises a base 27, an annular disc holder 28 having a disc receiver 28a and a toothed periphery 28b and a driving pinion 29 engaged with the toothed periphery 28b.

On the underside of the disc holder 28, an annular projection 28c is formed. The annular projection 28c is mounted on a plurality of rotating rollers 30 rotatably mounted on the base 27, so that the disc holder 28 is rotatably mounted on the base 27 about the axis Z. Thus, the disc holder 28 is positioned in the Z, X and Y axes by the roller 30.

In order to mount a large number of discs on the disc holder, there is a disc holder having an inside diameter of 200 mm.

Such a large disc holder causes the following problems.

(1) In order to precisely manufacture the disc holder, the manufacturing cost increases.

(2) It is difficult to produce the disc holder having a high preciseness.

SUMMARY OF THE INVENTION

An object of the present invention is to provide a disc reproducing system in which a rotating shaft is prevented from vibrating.

According to the present invention, there is provided a system for reproducing a disc comprising, a base, a disc holder for holding a plurality of discs, supporting means for rotatably mounting the disc holder on the base, guiding means provided between the disc holder and the base for guiding the disc holder so as to be rotated about an axis, rotating means for rotating the disc holder so as to position a desired disc to a predetermined position, a reproducing device for reproducing the desired disc, carrying means for carrying the desired disc between the predetermined position and the reproducing device.

The guide means comprises an annular groove and a plurality of projections engaged with the annular groove and the supporting means comprises a plurality of rollers which are annularly mounted on the base.

The disc holder has an annular shape in plan view. The annular groove is provided on underside of disc holder and the projections are mounted on the base, each of which has a cylindrical shape.

The rotating means includes a rack formed on an inside periphery of the disc holder, and a drive gear engaged with the rack.

One of the projections is disposed near an engaging point where the driving gear engages with the rack, and another projection is disposed on a line perpendicular to a line connecting said axis with the engaging point.

These and other objects and features of the present invention will become more apparent from the following detailed description with reference to the accompanying drawings.

BRIEF DESCRIPTION OF DRAWINGS

FIGS. 24*a* to 24*e* are side views showing operation of a base portion of the carrying device;

DETAILED DESCRIPTION OF THE PREFERRED EMBODIMENT

The first embodiment of the present invention will be described with reference to FIGS. 1 to 5.

An annular disc holder 120 is rotatably mounted on a rack base 110 in a housing 100.

Figure 3:
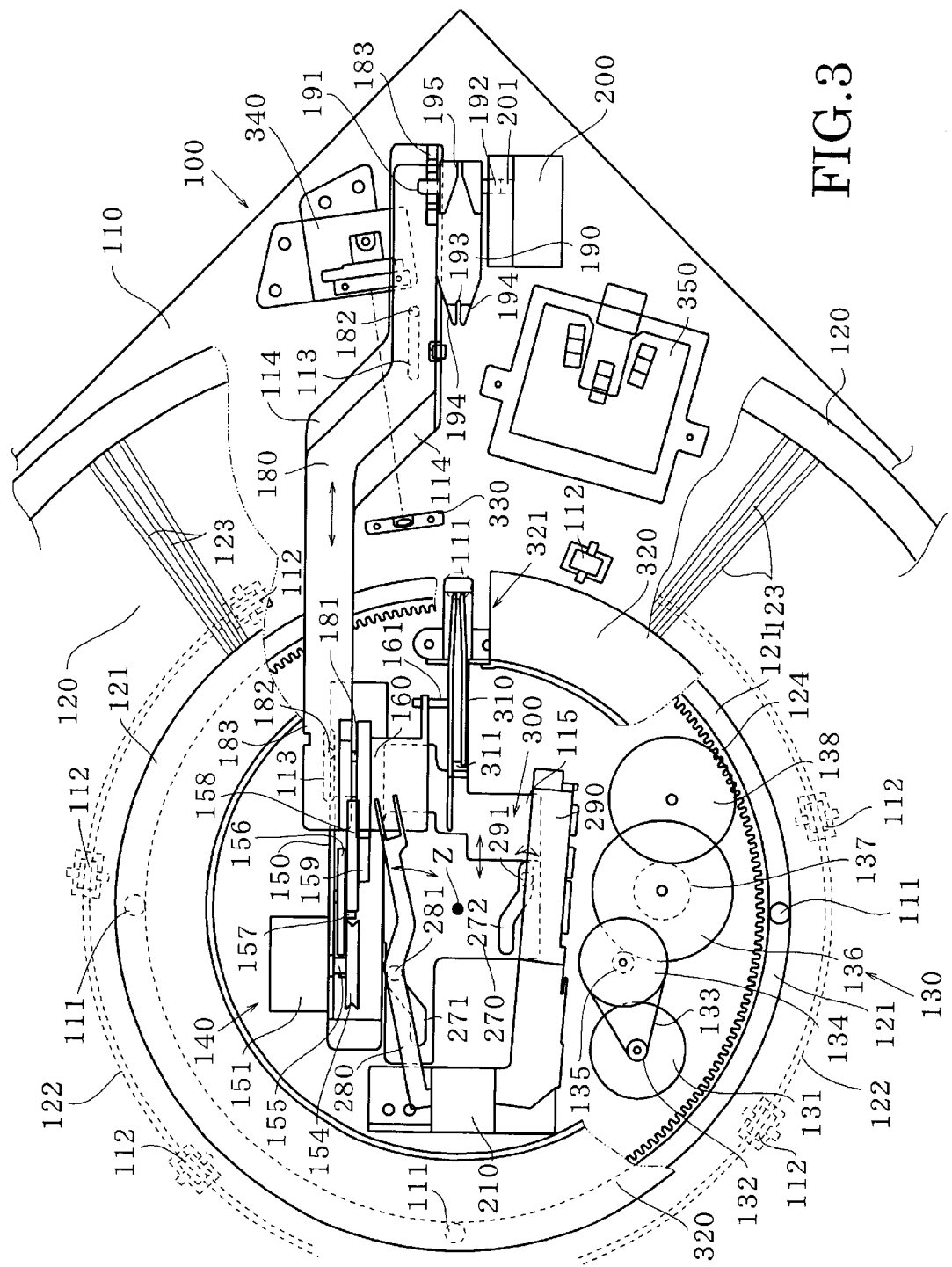
FIG. 3 is a plan view showing a part of the device.

A plurality of cylindrical projections 111 are annularly mounted on the rack base 110 along a circle about an axis Z which is the rotating center of the annular disc holder 120. Furthermore a plurality rotating rollers 112 are rotatably mounted on the rack base 110 along a circle about the axis Z. The shaft of each roller 112 are radially disposed as shown in FIG. 3.

On the underside of the disc holder 120, an annular groove 121 is formed to be engaged with the projections 111 on the rack base 110. Each of the projections 111 may be a cylinder rotating about a vertical shaft.

An annular projection 122 is formed on the underside of the disc holder 120 to be mounted on the rollers 112, so that the disc holder 120 is rotatably mounted on the rollers 112.

The disc holder 120 is provided with an information recording medium (hereinafter called disc) storing portion, which has a plurality of radially arranged partition plates 123 for vertically storing discs.

Figure 2:
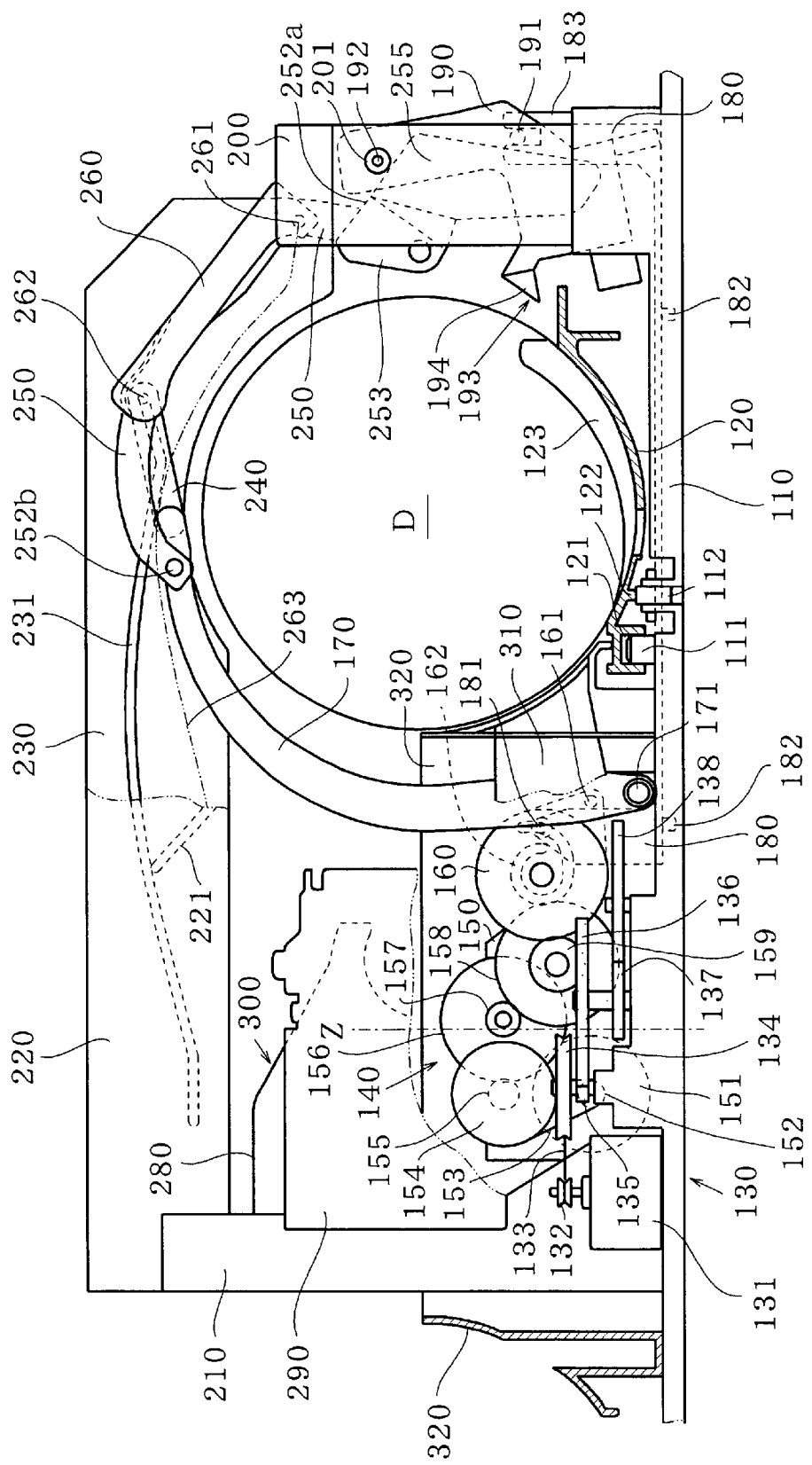
FIG. 2 is a side view of the device.

As shown in FIGS. 2 and 3, a rack driving device 130 is provided on the rack base at a central portion of the rack holder 120. The rack driving device 130 has a driving motor 131. Securely mounted on a output shaft of the motor 130 is a pulley 132 which is connected to a pulley 134 by a V-belt 133. A pinion 135 coaxial with pulley 134 engages with a reduction gear 136 rotatably mounted on the rack base 110. A pinion 137 on the shaft of the gear 136 engages with a driving gear 138 rotatably mounted on the rack base 110. The driving gear 138 engages with a rack 122 formed on an inner periphery of the disc holder 120.

A gear driving device 140 having a disc loading is provided on a central portion of the disc holder 120, as a loading device of the disc D. A disc reproducing device 300 having a loading motor 151 is provided adjacent the driving device 140, as a driving source of a driving arm 170. A pulley 152 on the shaft of the loading motor 151 is connected to a pulley 154 held on a gear holder 150 by a V-belt 153. A pinion 155 on the shaft of the pulley 154 is engaged with a reduction gear 156, and a pinion 157 coaxial with the gear 156 is engaged with a reduction gear 158. A pinion 169 coaxial with the gear 158 meshes with a circular driving cam 160.

A pin 161 provided on a side of the cam 160 is engaged with a cam groove 172 (FIG. 24*a*) provided on a base portion of the arm 170 rotatably mounted by a shaft 171 so as to rotate the arm 170. A cam groove 162 formed on the other side of the cam 160 is engaged with a guide pin 181 provided on a slide plate 180 so as to reciprocate the slide plate 180.

As shown in FIG. 3, the slide plate 180 is mounted on the rack base 110 underside of the disc holder 120. A pair of guide pins 182 projected from the underside of the slide plate 180 are slidably engaged with guide grooves 113, so that the slide plate 180 is slid in a groove 114.

On the other side of the slide plate 180, a vertical recess 183 is formed for controlling a pressure plate 190. On the one of the sides, a guide pin 191 is provided to be engaged with the recess 183.

A guide pin 192 mounted on the pressure plate 190 and projected in the opposite direction to the guide pin 191 is engaged in a hole 201 of a holding base 200 (hereinafter described). When the slide plate is reciprocated, the pressure plate 190 is rotated about the guide pin 192.

A V-shaped end 193a (FIG. 3) is formed on the pressure plate 190, and a gripping groove 193 is formed for gripping a desired disc D, and inclined side faces 194 are also formed so that the side faces 194 are inserted into the gaps between the desired disc D and adjacent discs D', thereby increasing the gap in the circumferential direction of the disc holder 120.

In addition, the pressure plate 190 has a guide groove 195 in which a guide portion 255 (FIG. 4) of a carrier arm 250 is adapted to be engaged.

On the other hand, a cramp post 210 is mounted on a central position of the disc holder 120, and the pusher plate holding base 200 (FIG. 2) is mounted on the rack base 110 outside the disc holder 120. Mounted on upper portions of the cramp post 210 and of the holding base 200, is a pair of guides 220 (L) and 230 (R) over the disc holder 120 (FIG. 2).

Figure 1:
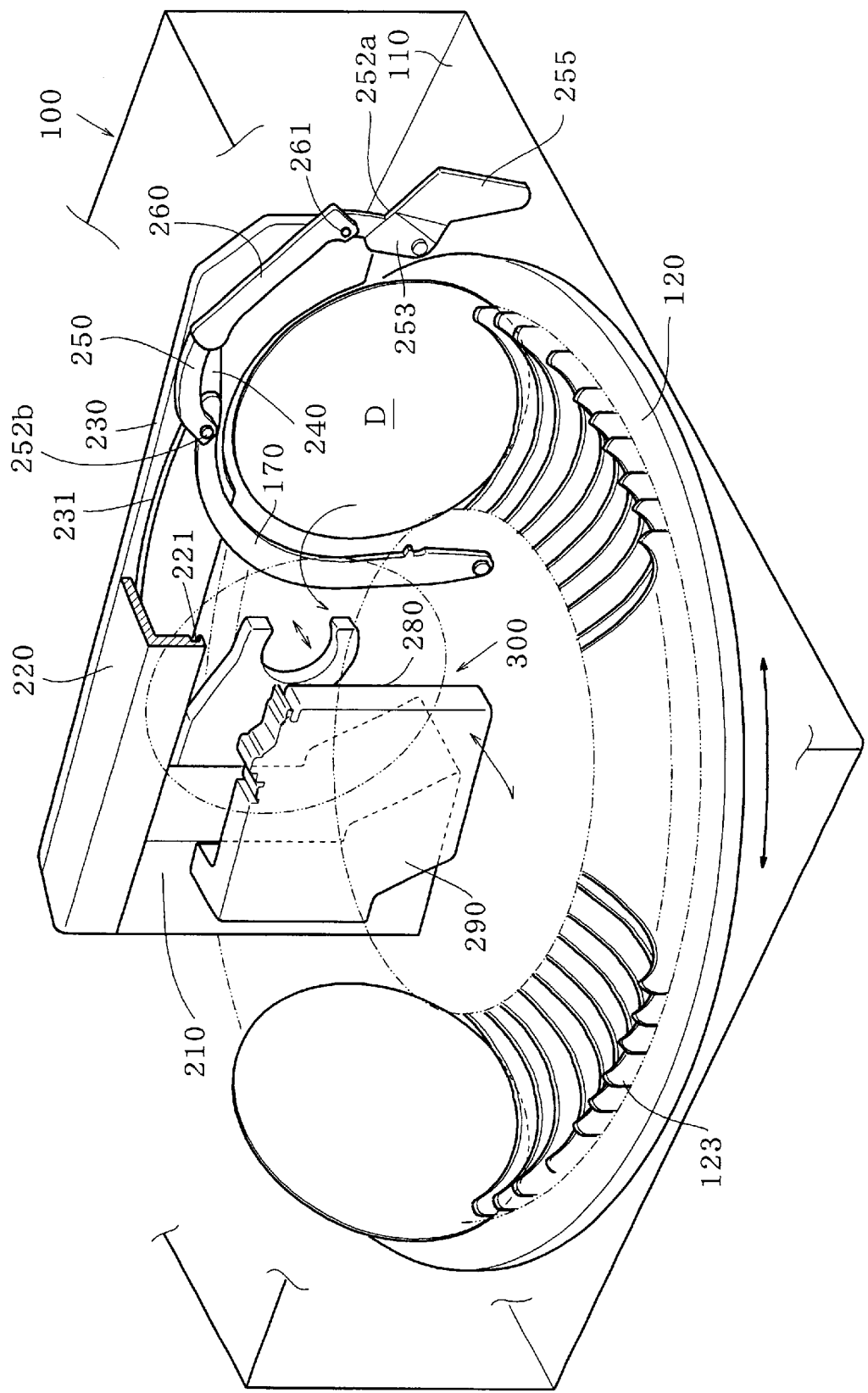
FIG. 1 is a perspective view of a reproducing device to which the present invention is applied, as a first embodiment.
Figure 4:
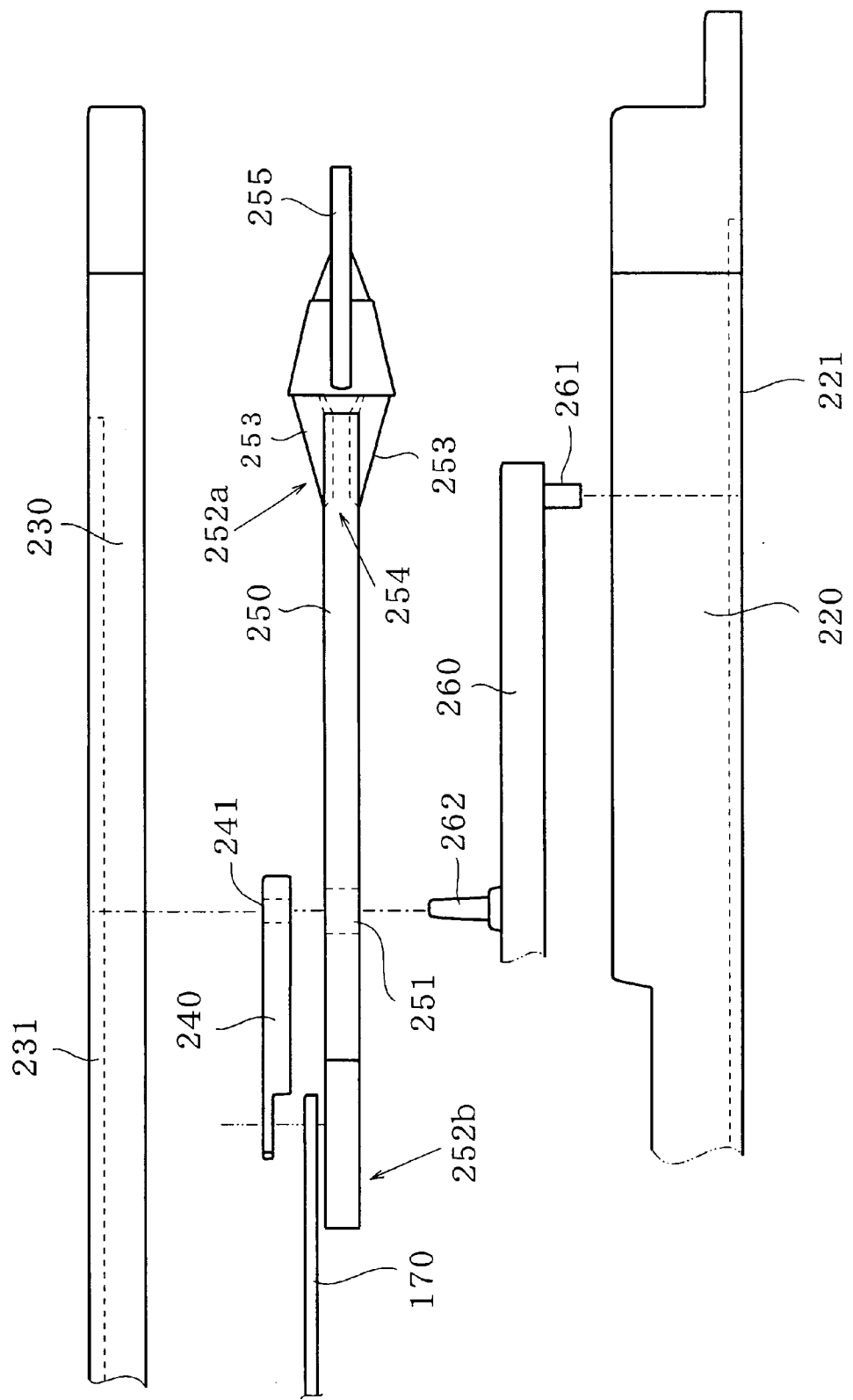
FIG. 4 is a plan view showing a carrying device.

As shown in FIGS. 1 and 4, the guide 220 has a guide groove 221 at the inside wall thereof. In the guide groove 221, a guide pin 261 of a guide arm 260 is slidably engaged. A guide groove 231 is formed on the guide 230 opposite to the guide groove 221.

On the other hand, the guide arm 260 has a guide pin 262 which passes through a hole 251 of a carry arm 250 and a hole 241 of an intermediate arm 240, and is slidably engaged with the guide groove 231. The intermediate arm 240 is connected to an end of the driving arm 170.

The carry arm 250 has engaging portions 252a and 252b at both ends thereof. The engaging portion 252a has inclined side faces 253 which slidably engage only with the peripheral edges of the adjacent discs D' adjacent to the desired disc and a groove 254 slidably engaged with the peripheral edge of the desired disc D. (FIGS. 2, 4)

The engaging portions 252a and 252b of the carry arm 250 hold the disc D, and takes out it from the disc holder, and carry it to the disc reproducing device 300.

On the end of the carry arm 250, the guide portion 255 is provided for positioning the disc. The guide portion 255 is shaped into a thin flat plate (FIG. 4). Before the disc D is carried to the reproducing device 300, the guide portion 255 is inserted in the guide groove 195 of the pressure plate 190 (FIG. 3). As a result, the carry arm 250 is exactly positioned. Therefore, the engaging portions 252a and 252b are accurately engaged with the disc D on the disc holder 120.

Figure 5:
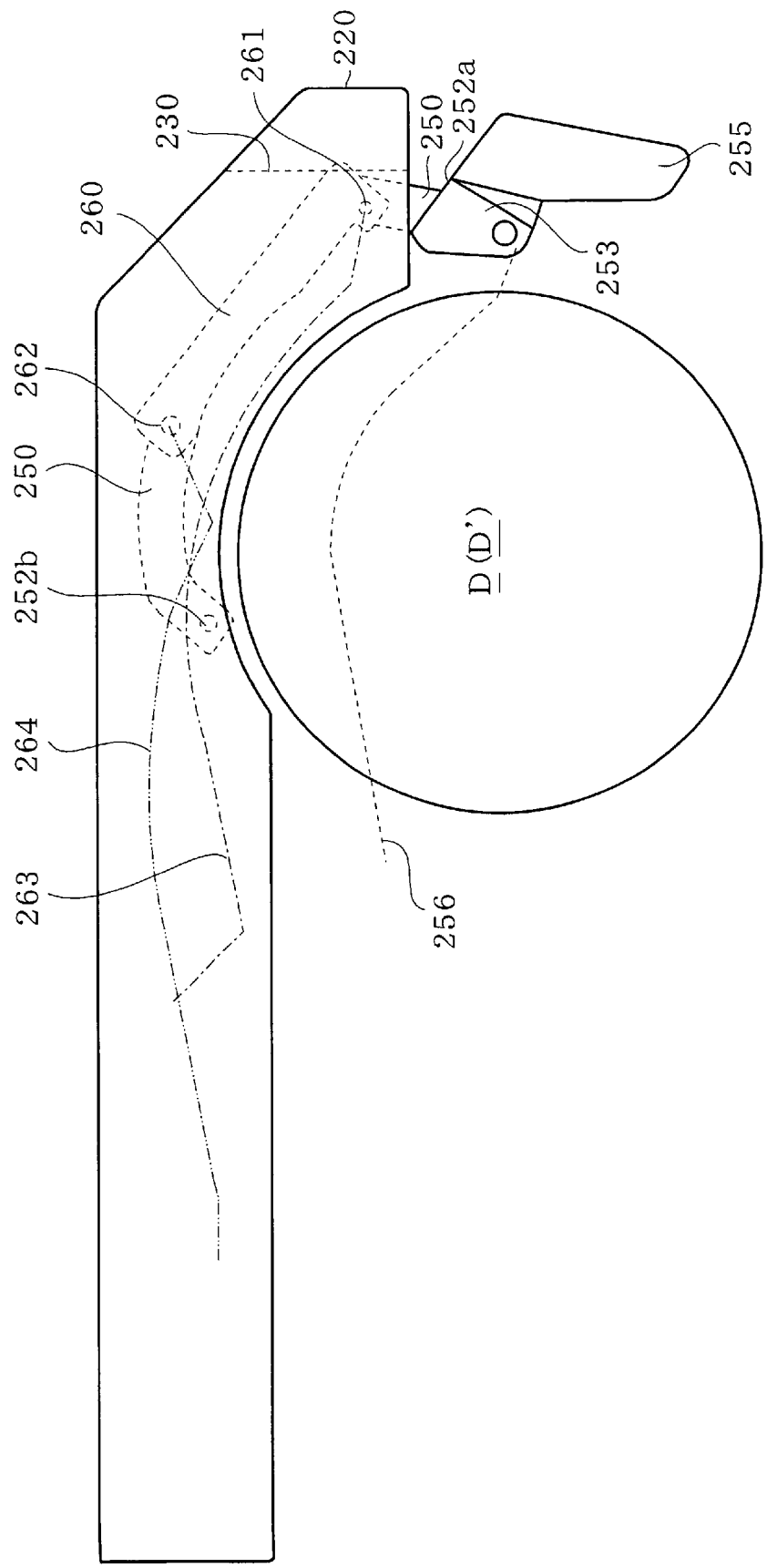
FIG. 5 is a side view of the carrying device.

Referring to FIG. 5, a dot-dash line 263 indicates a passage when the guide pin 261 at the end of the arm 260 is moved along the guide groove 221 (FIG. 1). A dot-dash line 264 indicates a passage when the pin 262 is moved along the guide groove 231 (FIG. 9) of the guide 230. A doted line 256 shows a passage of the engaging portion 252a of the arm 250 when the arm 260 is moved along the guide grooves 221 and 231 of the guides 220 and 230. The passage 256 are shaped so as to move along a peripheral portion of each of the adjacent discs D'.

As shown in FIG. 3, a driving cam 270 is slidably engaged with a groove 113 of the rack base 110 at a central portion of the disc holder 120 so as to be reciprocated in the groove 113. The driving cam 270 is driven by the motor 151.

On the driving cam 270, a pair of guide grooves 271 and 272 are formed for operating a clamper holder 280 and a servo device 290 of reproducing device 300.

Guide pins 281 and 291 provided underside of the clamper holder 280 and servo device 290 which are pivotally mounted on the clamper post 210 are slidably engaged with the guide grooves 271 and 272 of the cam 270. Thus, the clamper holder 280 and servo device 290 are swayed when the cam 270 is reciprocated. On the servo device 290, a pickup, spindle motor and others are mounted.

Furthermore, on the rack base 110, a disc guide 310 and an annular cover 320 are provided. The cover 320 has a recess 321 engaged with the disc guide 310.

Figure 9:
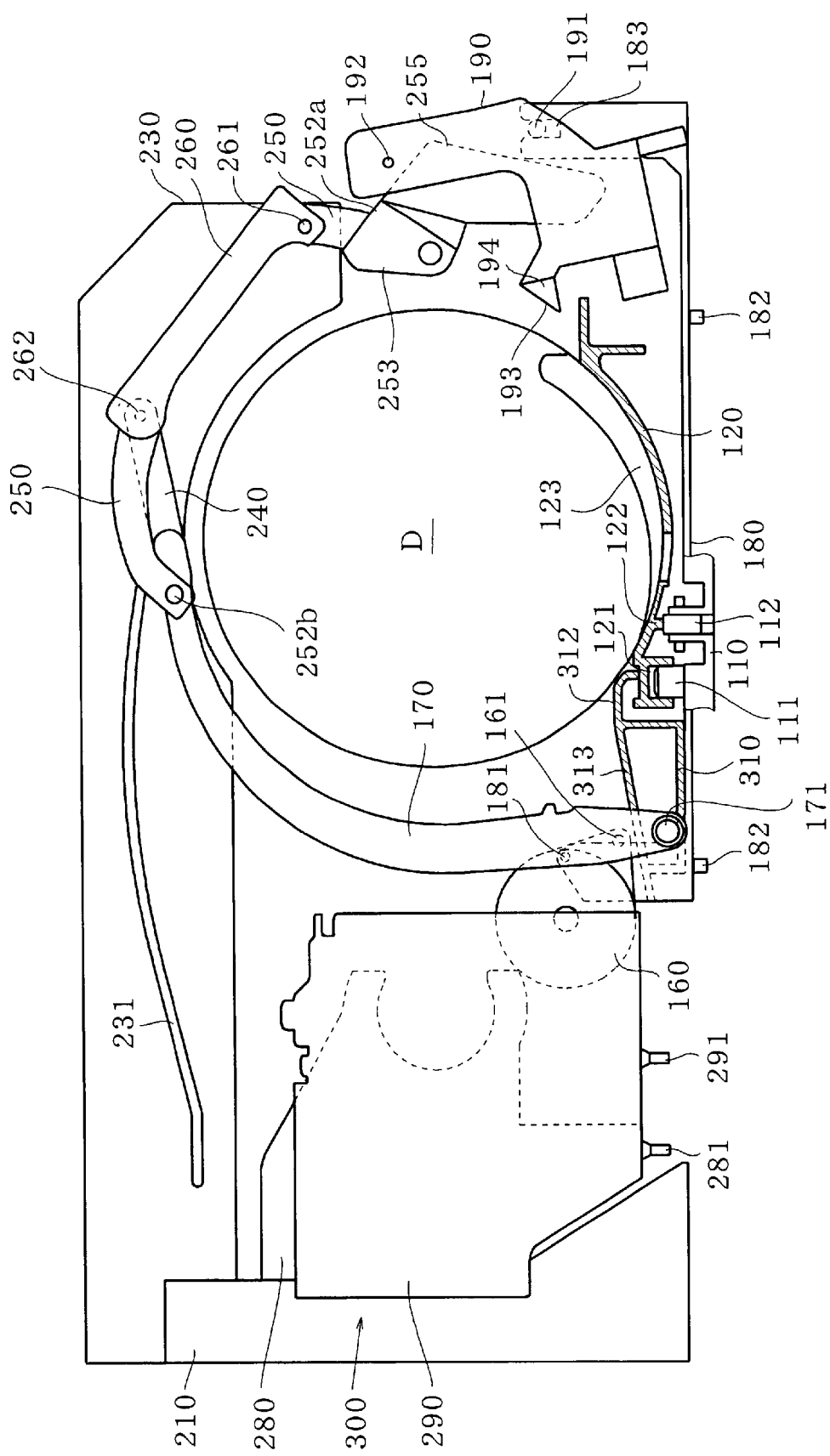
FIGS. 9 to 23 are side views showing operation of the carrying device.

The disc guide 310 is provided for guiding the disc D. To this end, the disc guide 310 has a groove 311, a bottom 312 of which is adapted to be engaged with the disc D (FIG. 9). Adjacent the bottom 312, an inclined portion 313 is formed.

Referring to FIG. 3, a sensor holder 330 and a sensor stay 340 are oppositely mounted on the base 110 so as to optically detect the disc D. Further, a sensor 350 is provided for detecting the address of the disc holder 120.

The operation of the device will be described hereinafter with reference to drawings.

FIG. 9 shows an unloading state of the disc D where the driving arm 170 and the guide arm 260 are located at right end positions. Furthermore, the slide plate 180 is also located at a right end position.

When selection of a desired disc is instructed from an operating panel (not shown), the motor 131 (FIG. 3) is operated to rotate the rack 122 through the gear train comprising gears 134, 135, 136, 137 and 138, thereby rotating the disc holder 120.

When the disc holder 120 is rotated about the axis Z, the opposite side walls of the annular groove 121 on the underside of the disc holder slides on the side wall of each projection 111, and the annular projection 122 on the underside of the disc holder 120 moves on the rollers 112, rotating them. Thus, the disc holder 120 is smoothly rotated.

Since the side walls of the annular groove 121 contact with each projection 111, the disc holder 120 is exactly rotated about the axis without providing a rotating axis.

When the address detecting sensor 350 detects that the desired disc D is located at the front position of the reproducing device 300, the disc holder 120 is stopped. Then the motor 151 (FIG. 3) is operated to drive the gear driving section 140, so that the driving cam 160 is rotated in the counterclockwise direction. The rotation of the driving cam 160 causes the slide plate 180 to slide to the left by engagement of the pin 181 of the slide plate 180 with the cam groove 162 of the cam 160. Accordingly, the pin 191 engaged with the recess 183 of the slide plate 180 is moved to the left, so that the pressure plate 190 is rotated in the clockwise direction about the pin 192.

Figure 10:
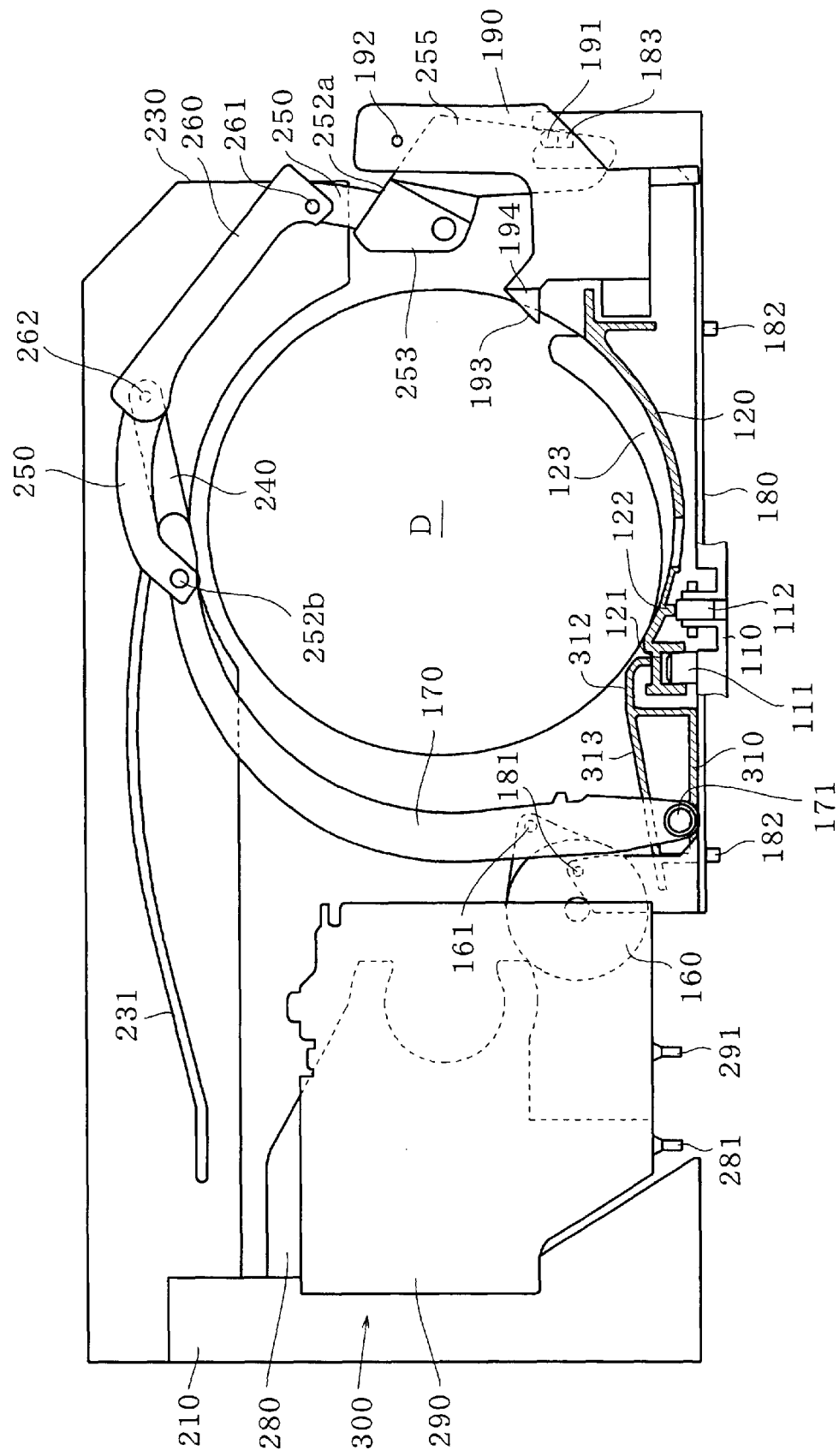
Figure 11:
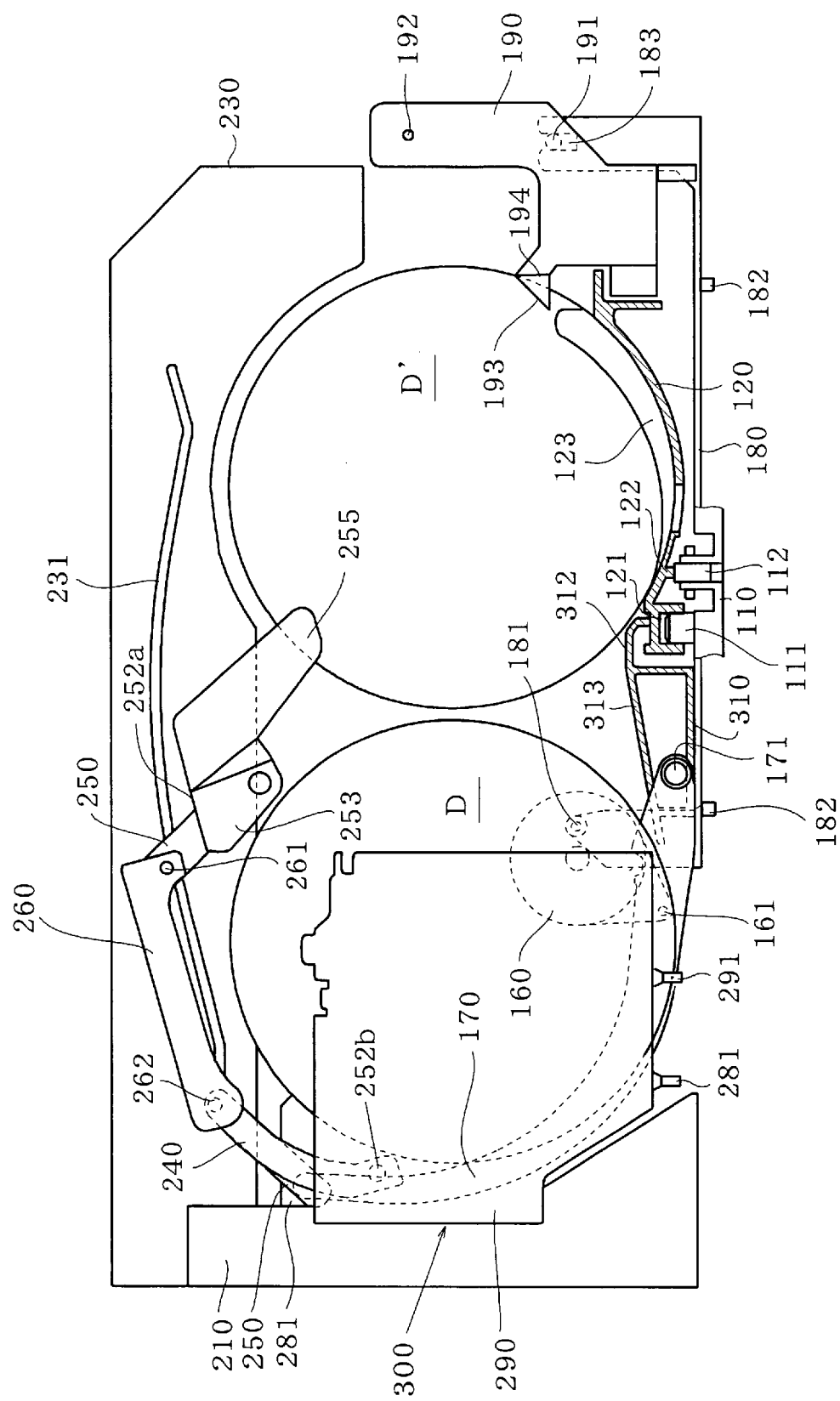

As shown in FIG. 10, the groove 193 of the push plate 190 is engaged with a peripheral portion of the desired disc D, and the inclined side faces 194 engage with discs D' at both sides of the desired disc D to push the discs D'. Thus, the spaces between the disc D and both side discs D' are expanded.

At that time, a part of the push plate 190 engages with a part of the disc holder 120 to securely hold the disc holder to prevent the disc holder 120 from vibrating during the operation.

Figure 23:
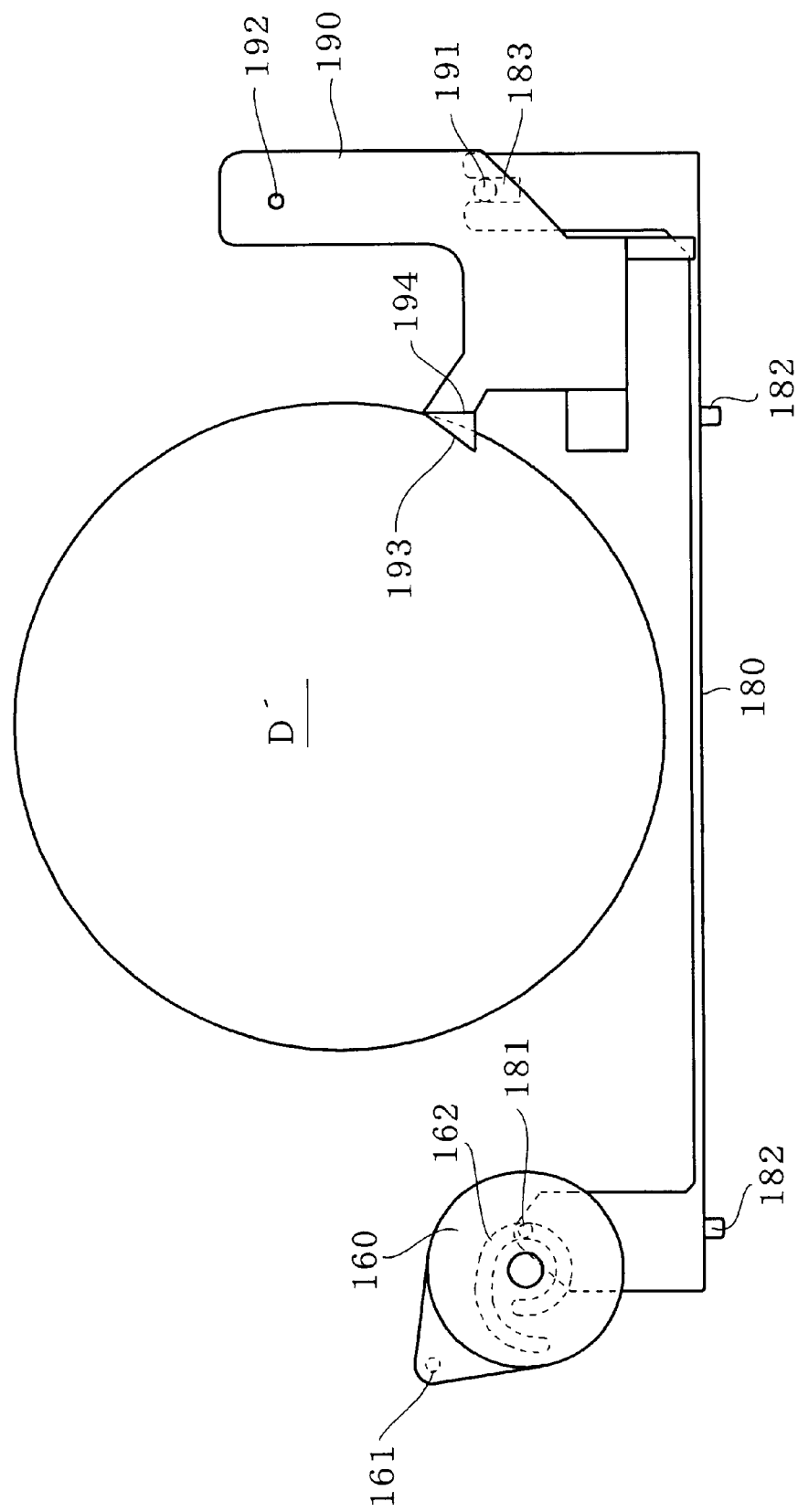

In such a condition, the slide plate 180 is kept at the position of FIG. 23 due to the shape of the cam groove 162.

During the above described operation the cam 160 rotates from the position of FIG. 24a to the position FIG. 24b. However, since a part 172a of the cam groove 172 has a circular shape of the same circle as the circle on which the pin 161 on the cam 160 moves, the arm 170 does not rotate.

When the cam 160 further rotates, the pin 161 enters a straight portion 172b as shown in FIG. 24c. Therefore, the arm 170 starts to rotate about the shaft 171 in the counterclockwise direction as shown is FIG. 24c.

The rotating arm 170 actuates the guide 260 and the carry arm 250 through the intermediate arm 240. Namely, the pin 261 of the arm 260 moves along the guide groove 221 of the guide 220, and the pin 262 of the arm 260 moves along the guide groove 231 of the guide 230.

Figure 12:
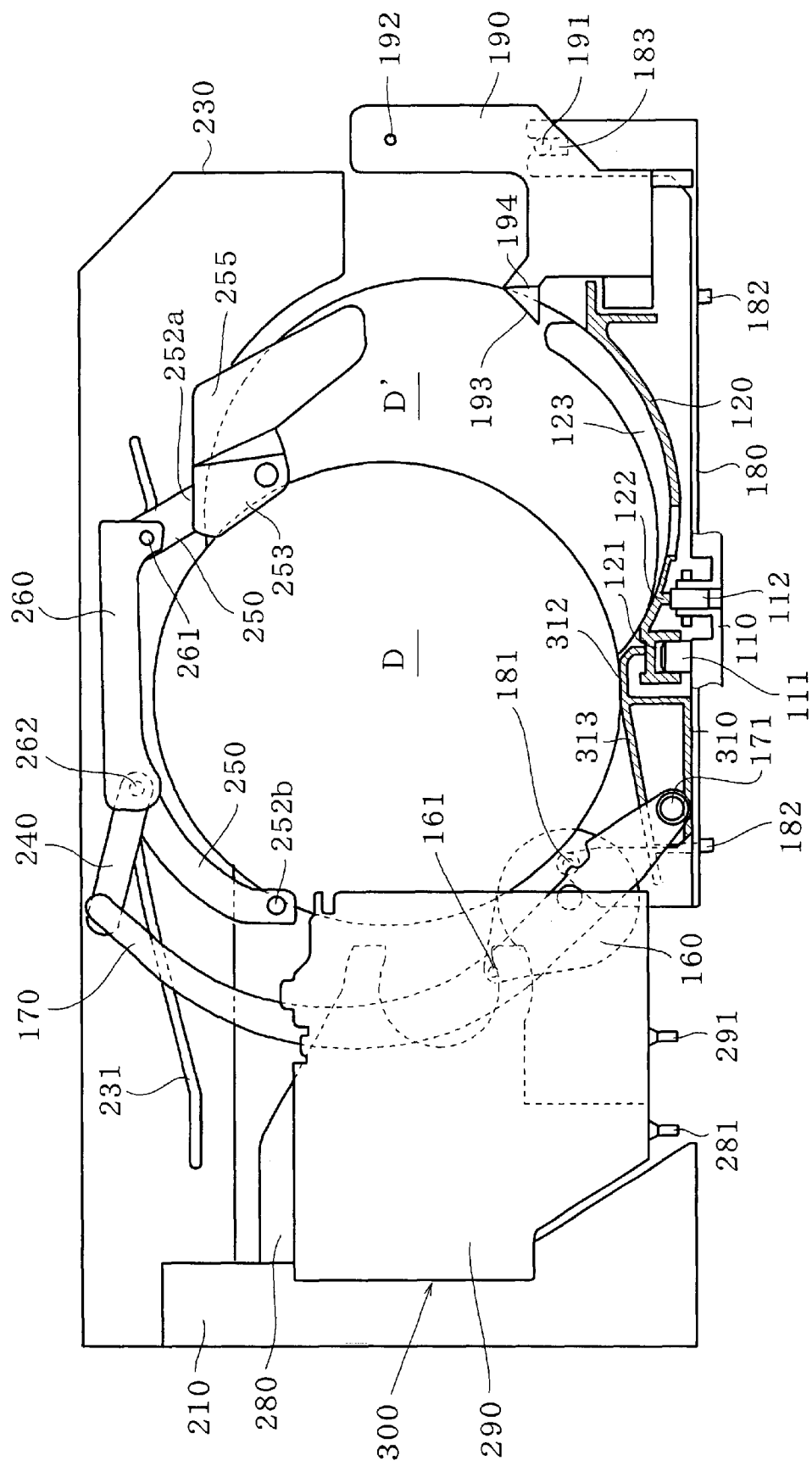
Figure 13:
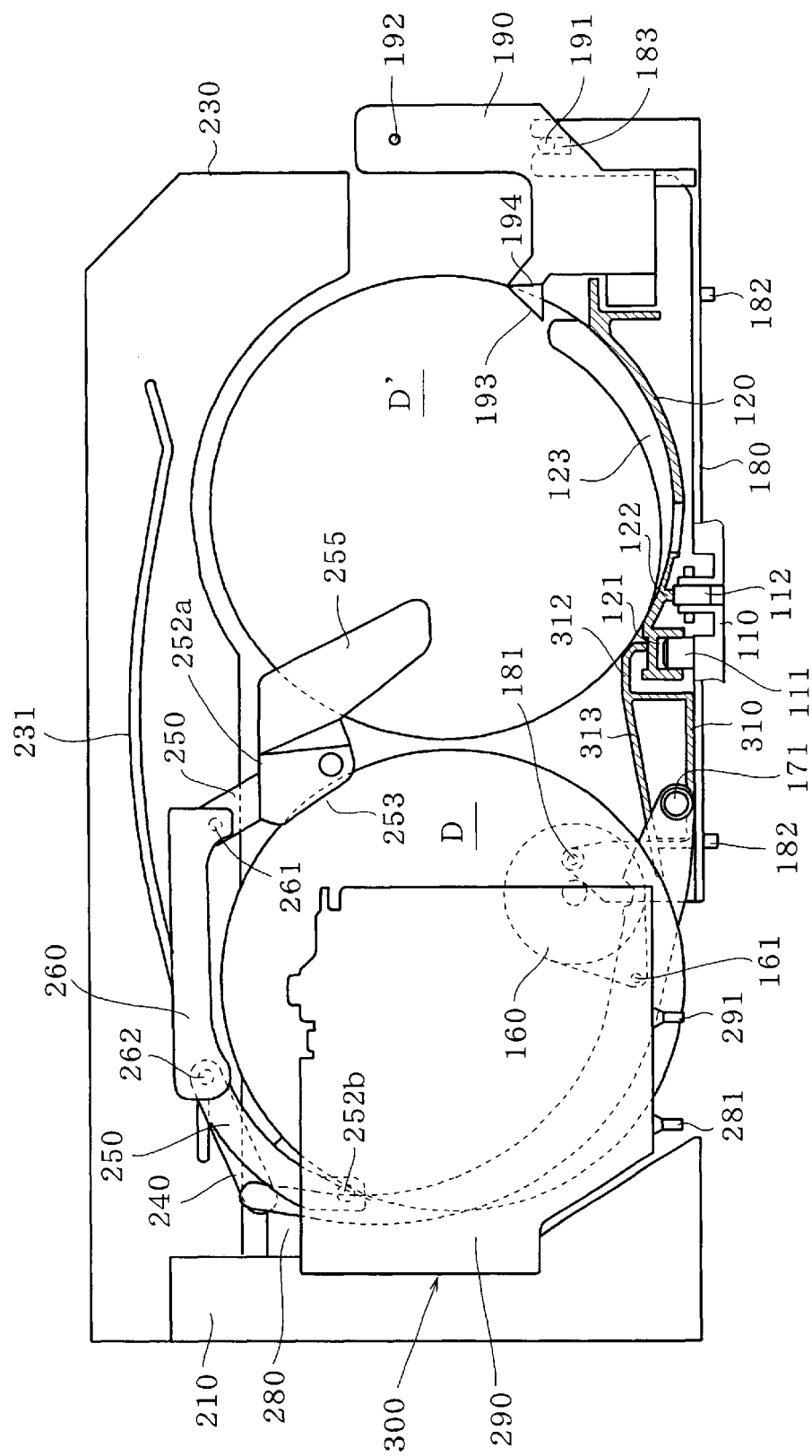

In the condition that discs D' on the both sides of the desired disc D are spaced from the disc D, the guide portion 255 of the arm 250 enters the guide groove 195 of the push plate 190. Therefore, ensurely, the groove 254 of the engaging portions 252a and 252b of the carrying arm 250 are slidably engaged with the peripheral portion of the desired disc D as shown in FIG. 12. The inclined portions 253 of the arm 250 are inserted in the spaces between the discs D and D' to further expand the space there-between. Further the disc D is removed from the disc holder 120 as shown in FIG. 12. The disc D is inserted in the groove 311 (FIG. 3), rolling the disc D on the bottom 312 and the inclined portion 313. Thus, the disc D is loaded on the reproducing device 300 as shown in FIG. 13.

Figure 14:
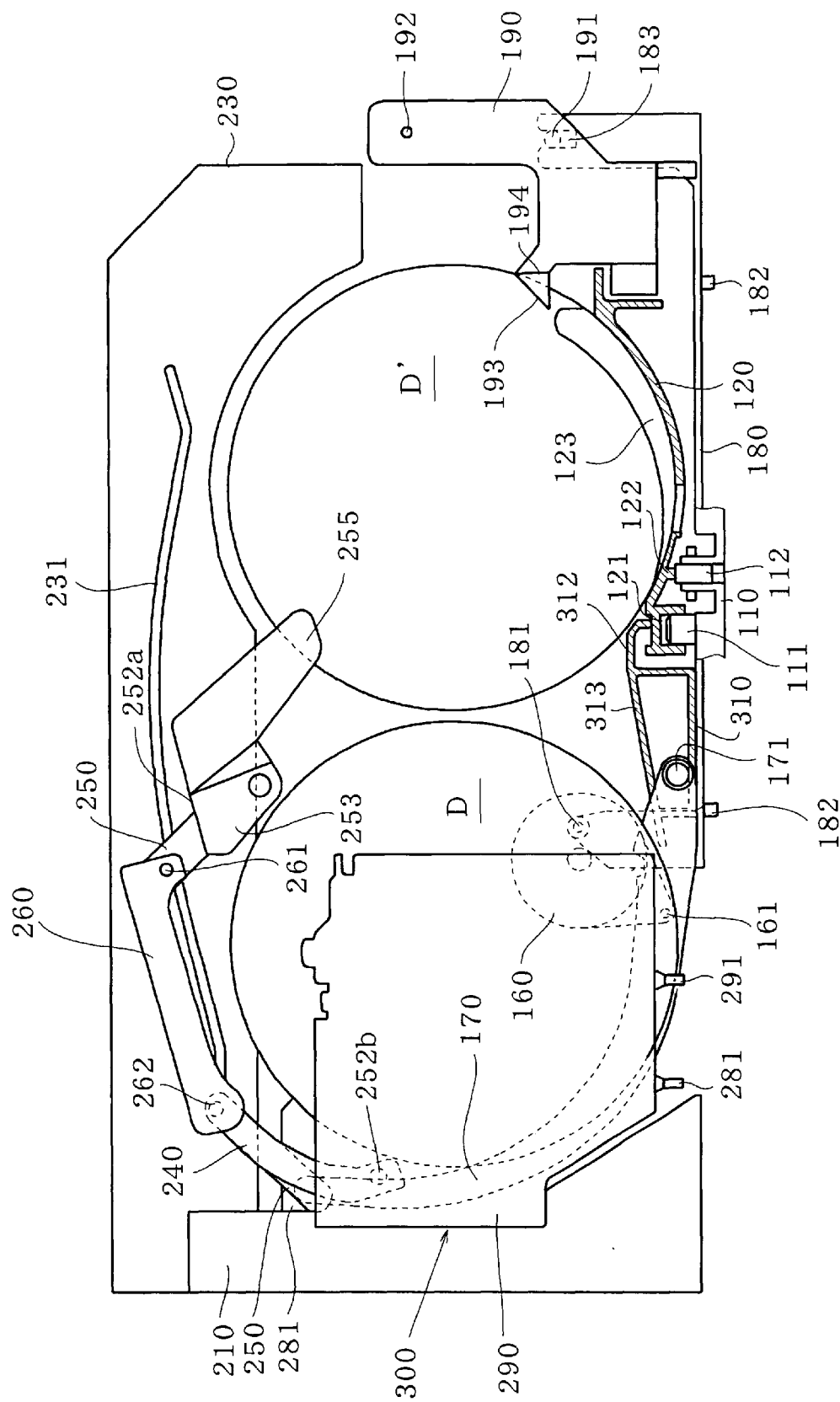

At that time, the pin 161 is still engaged with the straight portion 172b as shown in FIG. 24d. The pin 161 is further rotated in a groove 172c (FIG. 24e) to move the arm 170. Thus, as shown in FIG. 14, the engaging portions 252a and 252b of the carrying arm 250 are removed from disc D. On the other hand, the guide portion 255 is still inserted between the discs D'.

At the same time, the cam 160 moves the cam 270 to the right in FIG. 3 so that the pin 281 of the clamper holder 280 and the pin 291 of the servo device 290 are moved by cam grooves 271 and 272, thereby clamping the disc D carried by the carrying arm 250. Thus, the disc D is reproduced by the reproducing device 300.

In order to return the disc D to the disc holder 120, the above described operation is reversely performed as shown in FIGS. 14 to 20. The operation is described hereinafter.

When the returning of the disc D is demanded, the loading motor 151 is reversely operated. The cam 270 is moved to the left in FIG. 3, so that the clamper holder 280 and the servo device 290 are removed from the disc D.

The driving cam 160 is also reversely rotated, so that the pin 161 of the cam moves to the straight portion 172b of the cam groove 172 (FIG. 24e). Accordingly, the carrying arm 250 is lowered, and the engaging portions 252a and 252b engage the periphery of the disc D. The driving arm 170 is rotated in the clockwise direction as shown in FIGS. 24c and 24b, so that the disc D is removed from the reproducing device 300 and mounted on the bottom 312 of the groove 311 as shown in FIG. 16.

Figure 15:
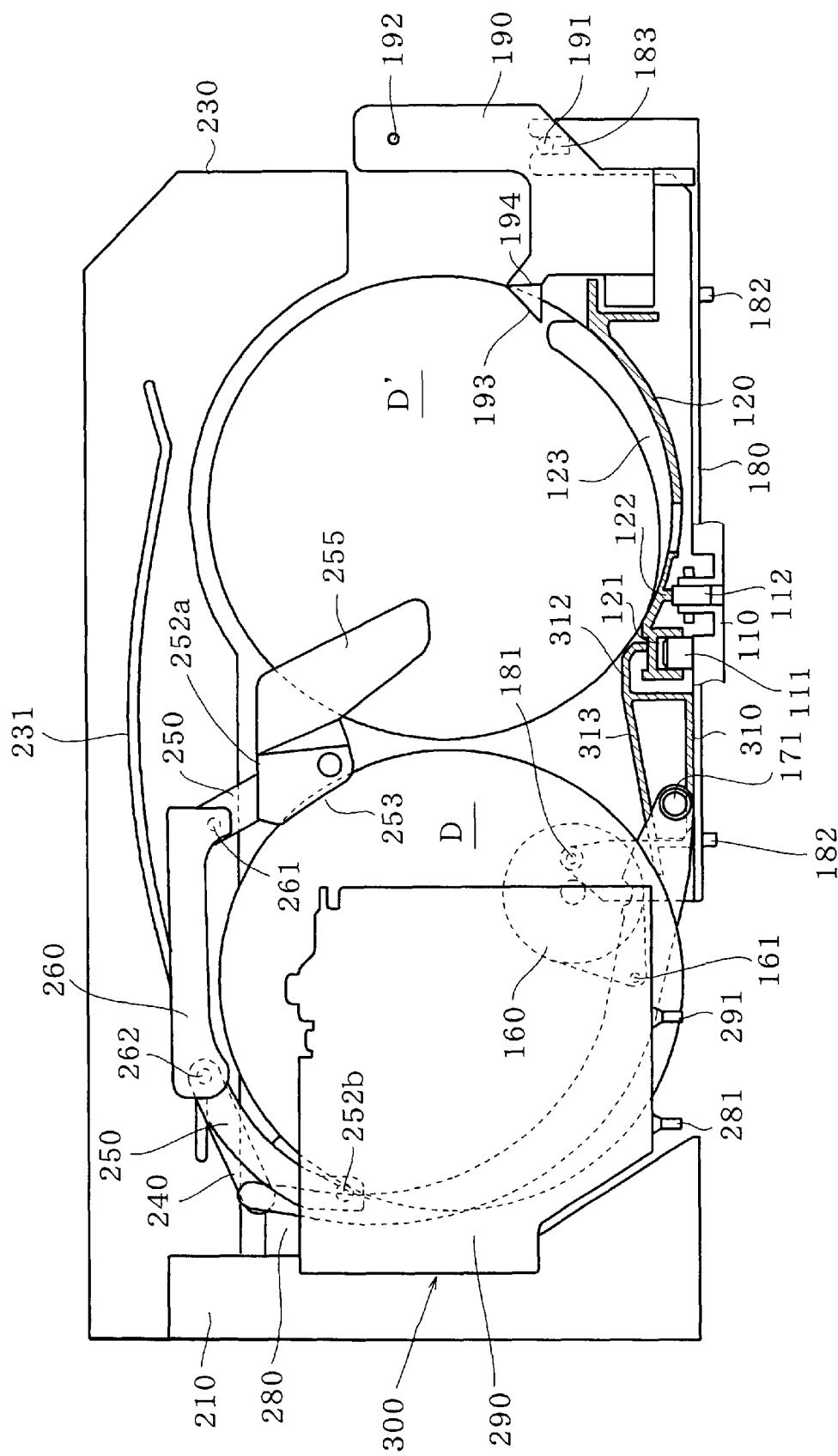
Figure 16:
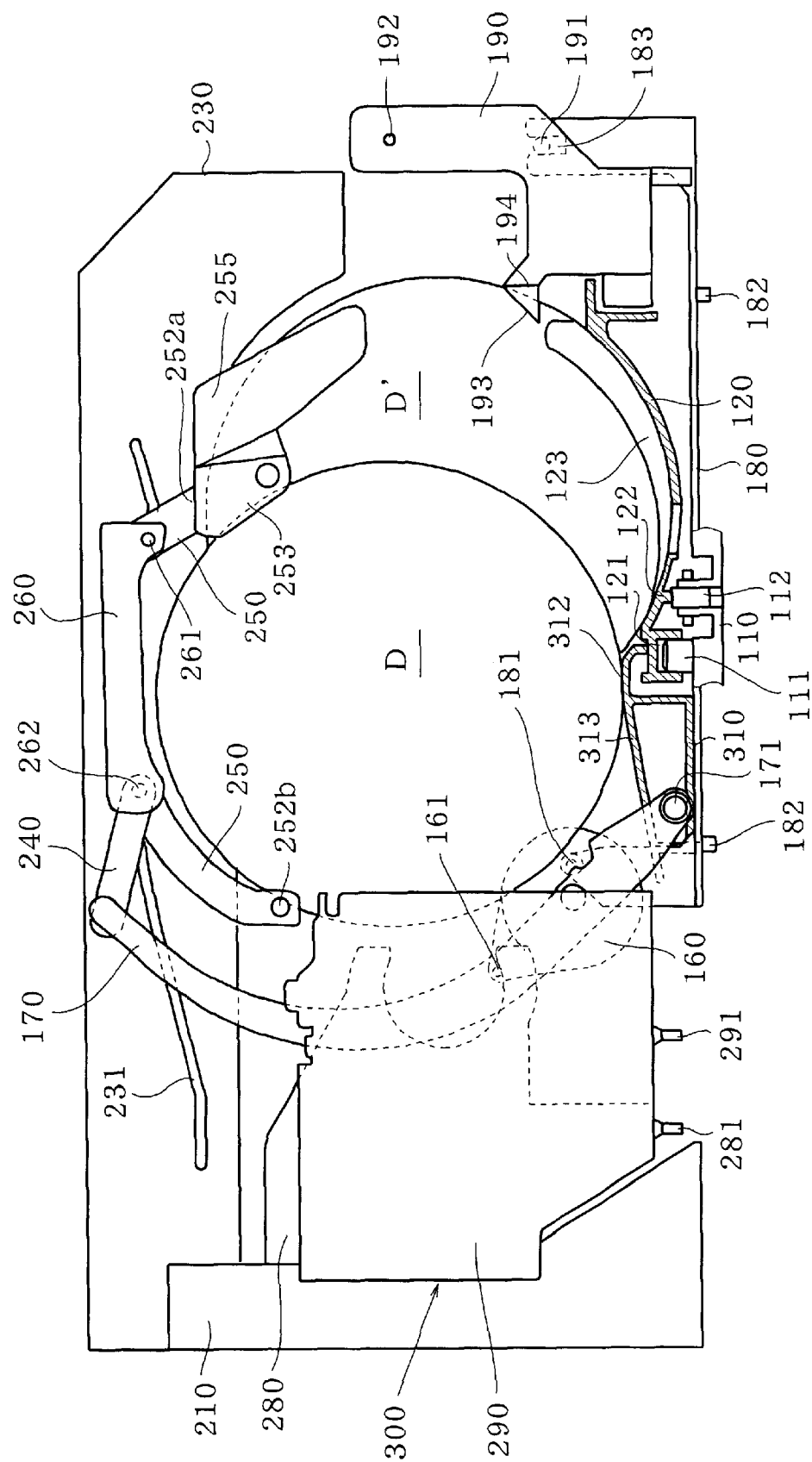
Figure 17:
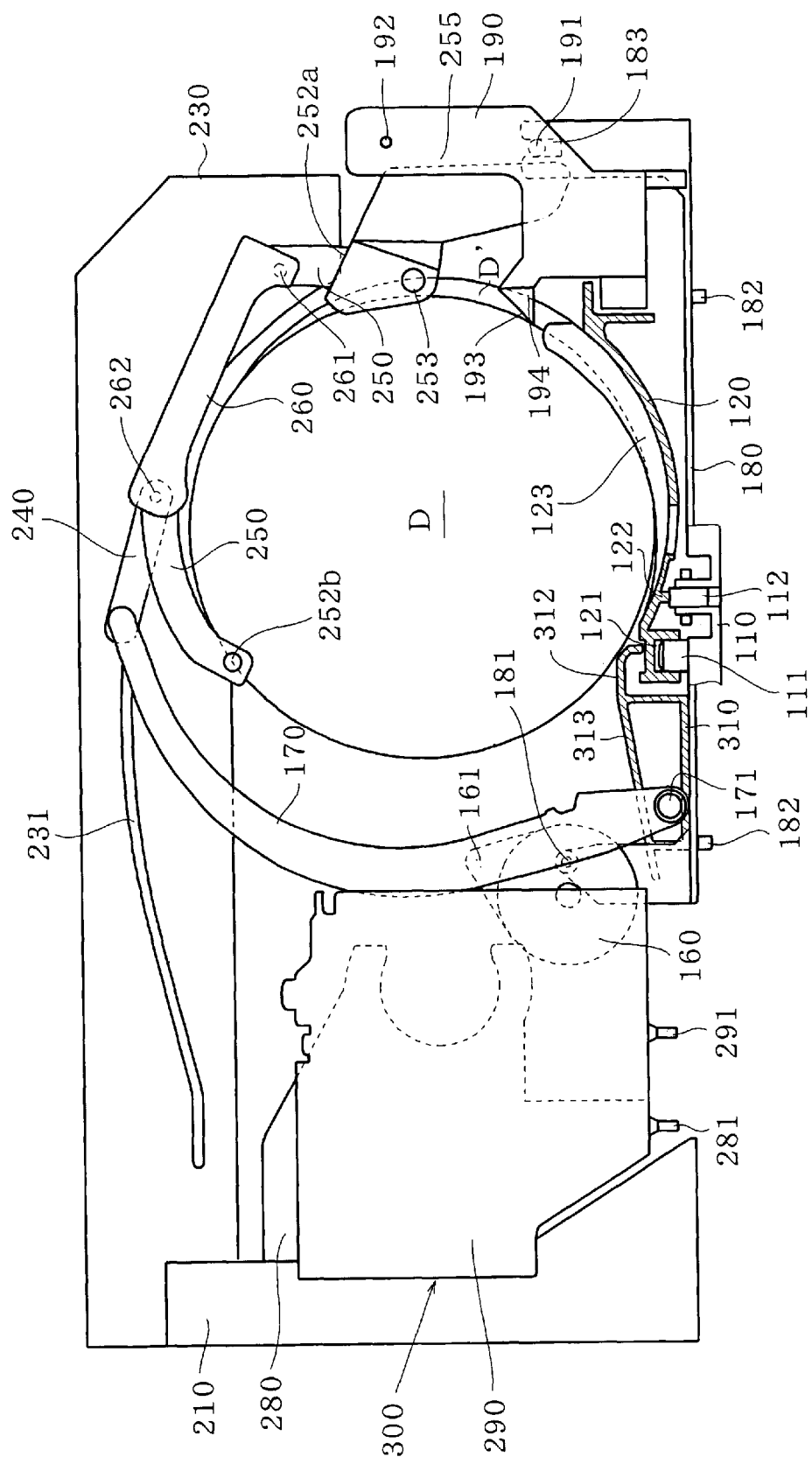
Figure 18:
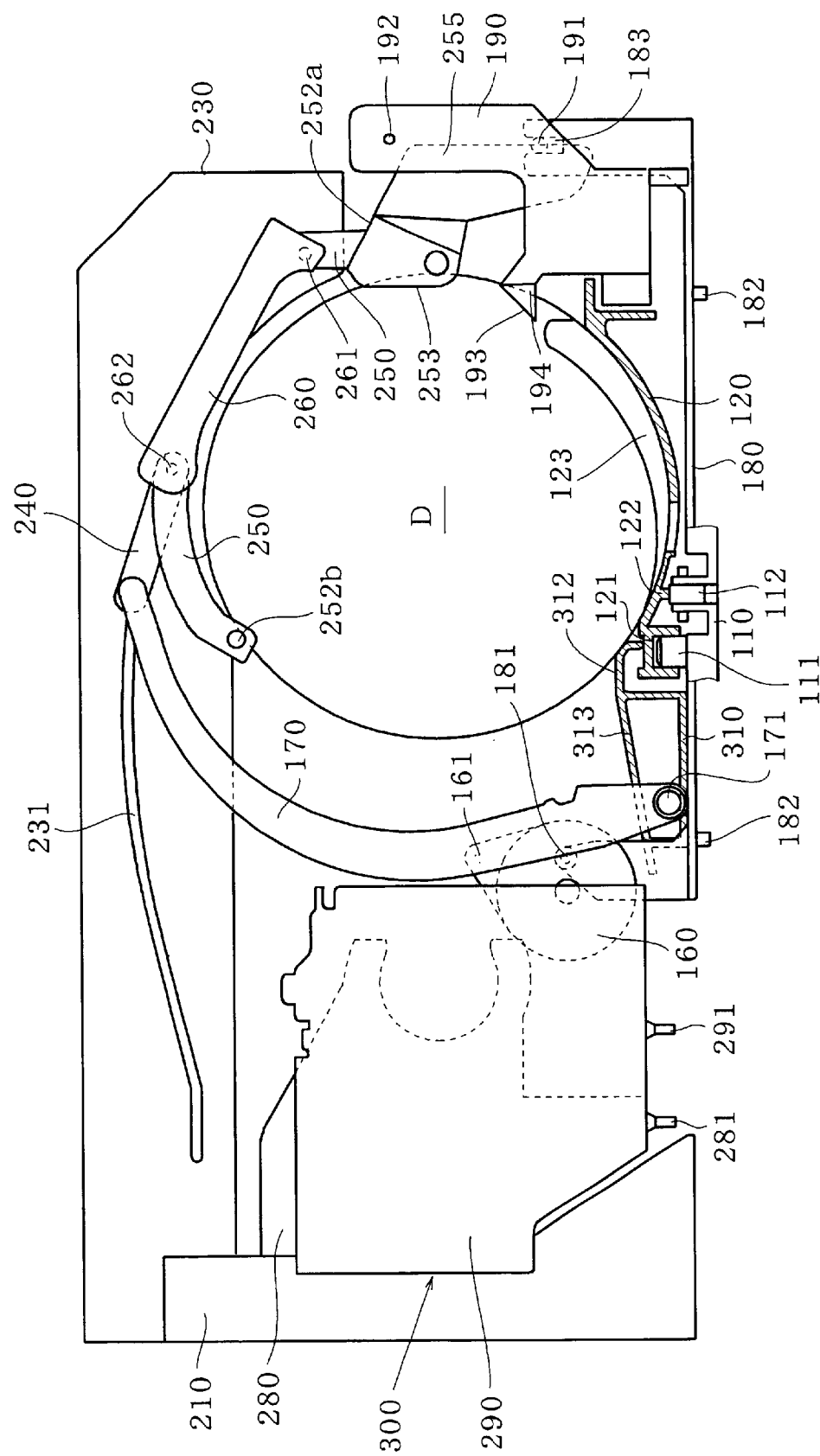
Figure 25:
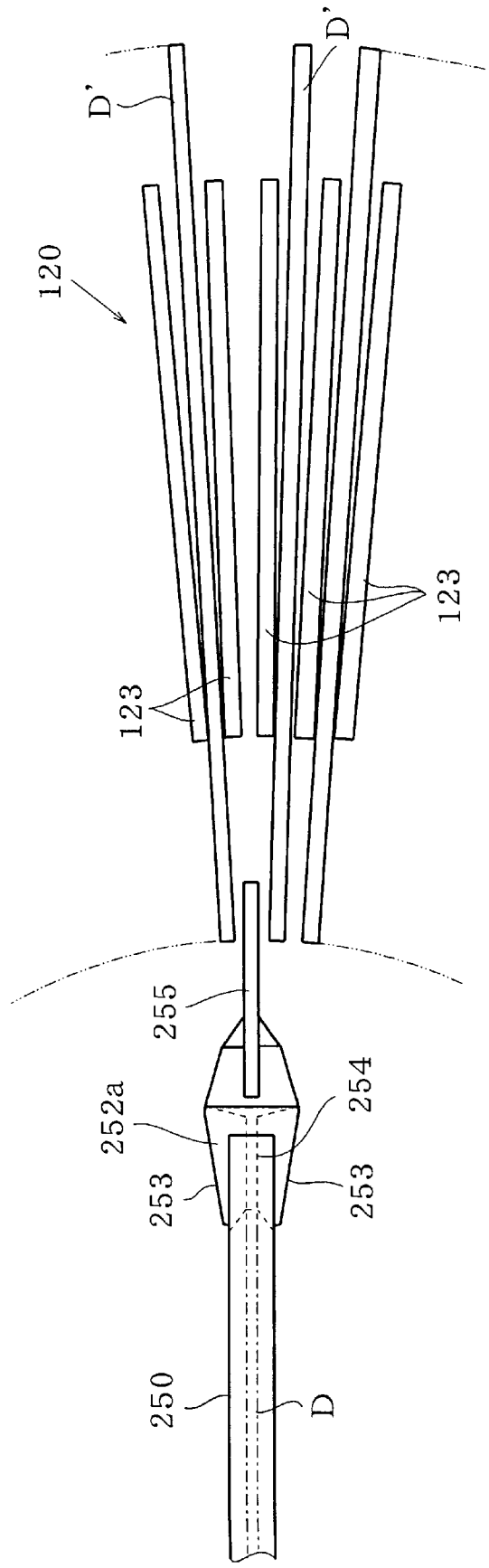
FIG. 25 is a plan view for explaining operation to return a disc.
Figure 26:
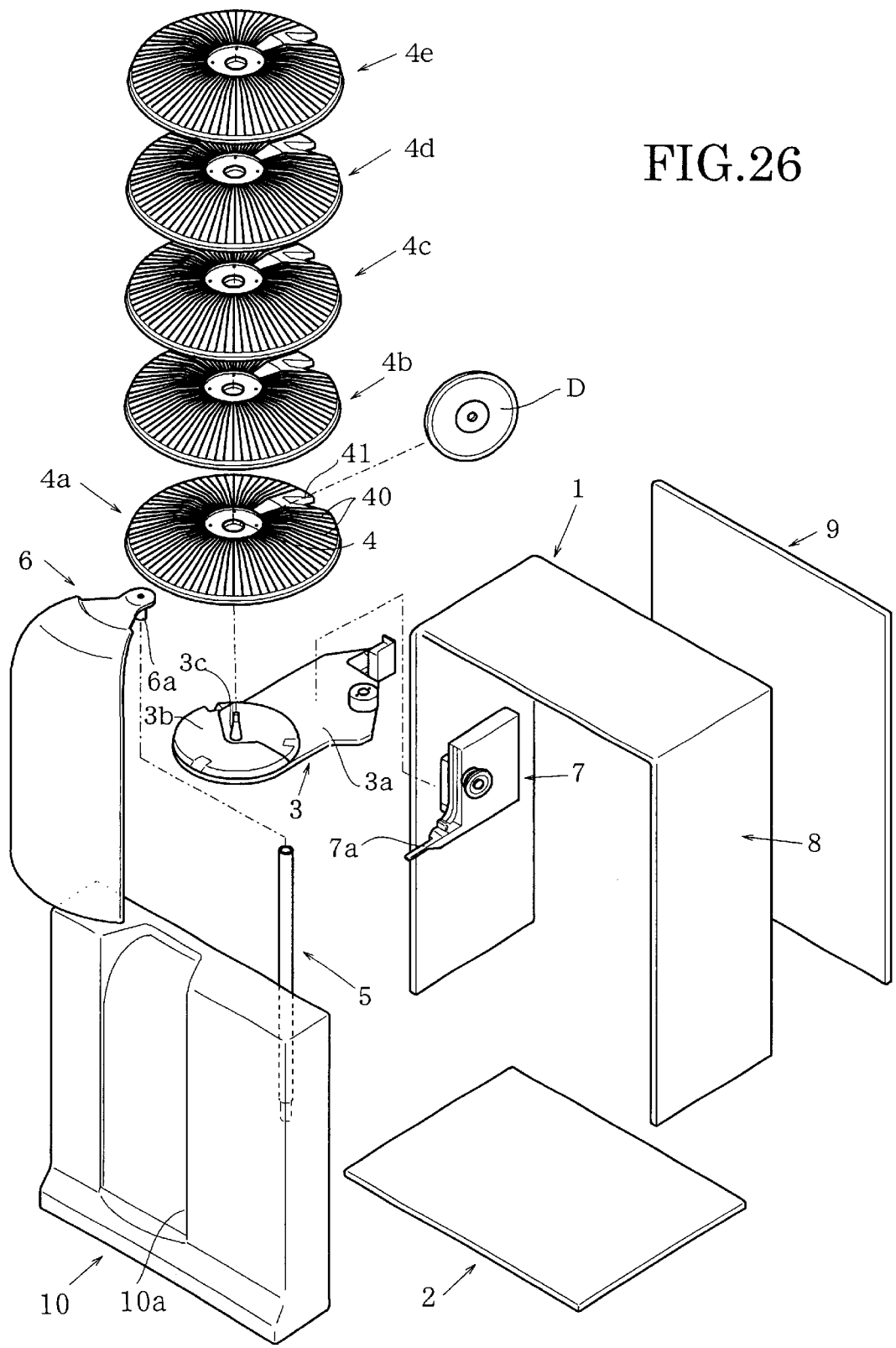
FIG. 26 is a perspective view showing a conventional device.
Figure 27:
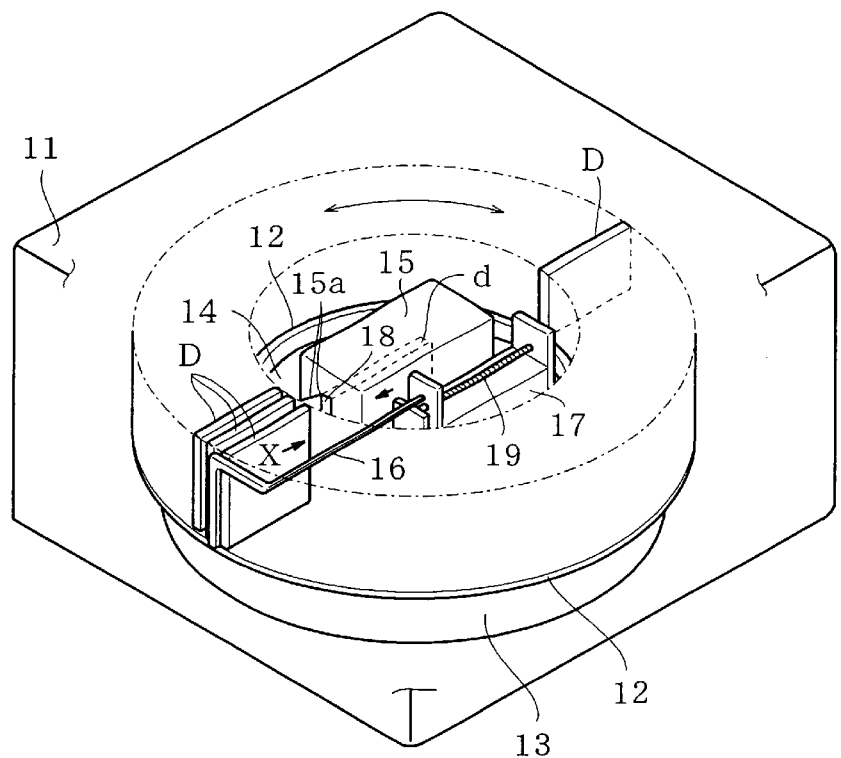
FIG. 27 is a perspective view of another conventional device.
Figure 28:
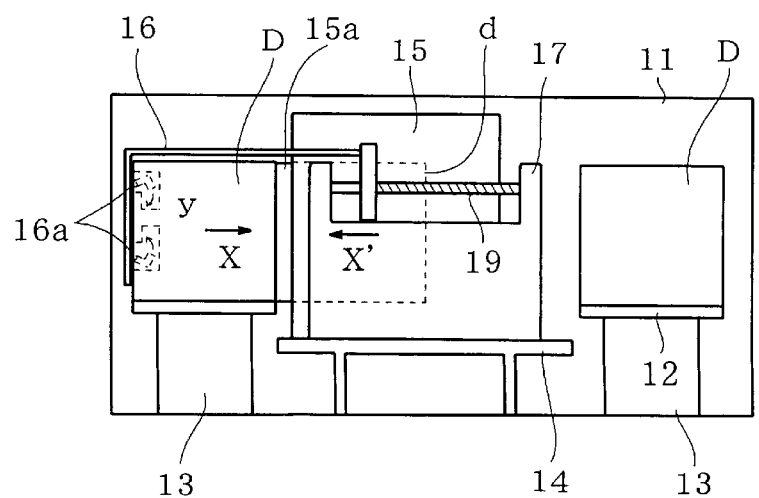
FIG. 28 is a sectional view of the device.
Figure 29:
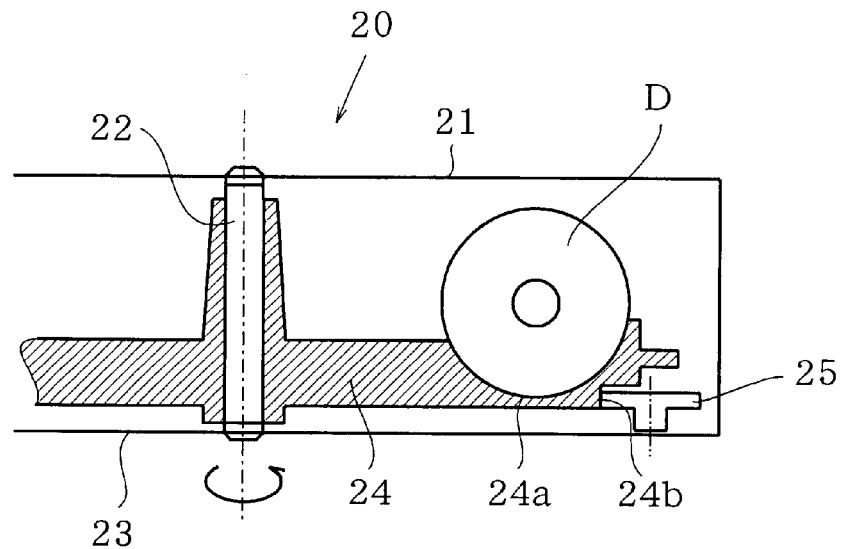
FIGS. 29 and 30 show other conventional devices.
Figure 30:
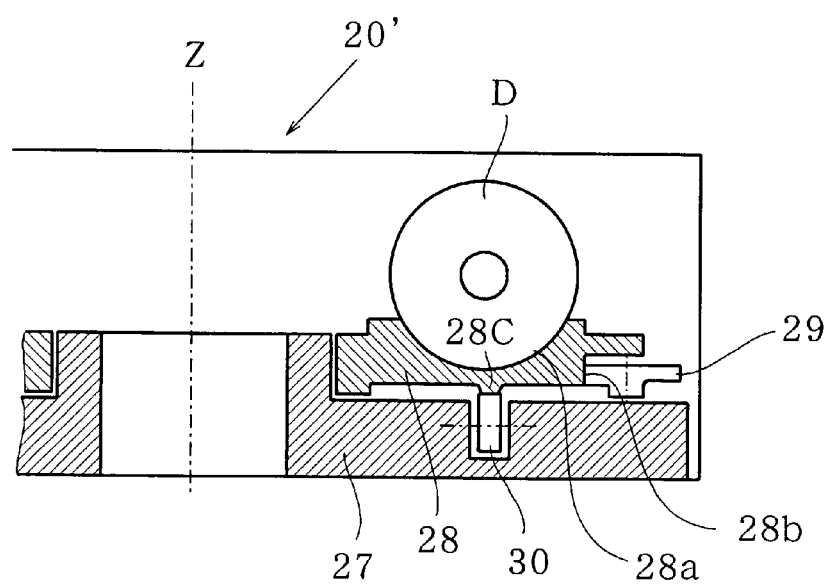

On the other hand, the guide portion 255 is always inserted between the discs D' as shown in FIGS. 14 to 16, during also the reproducing period. Therefore, the disc D can be exactly inserted between the discs D'. In addition, the inclined portions 253 of the carrying arm 250 are inserted between the discs D' (FIG. 25) to further expand the space there-between. Thus, the insertion of the disc D is more ensured.

Figure 19:
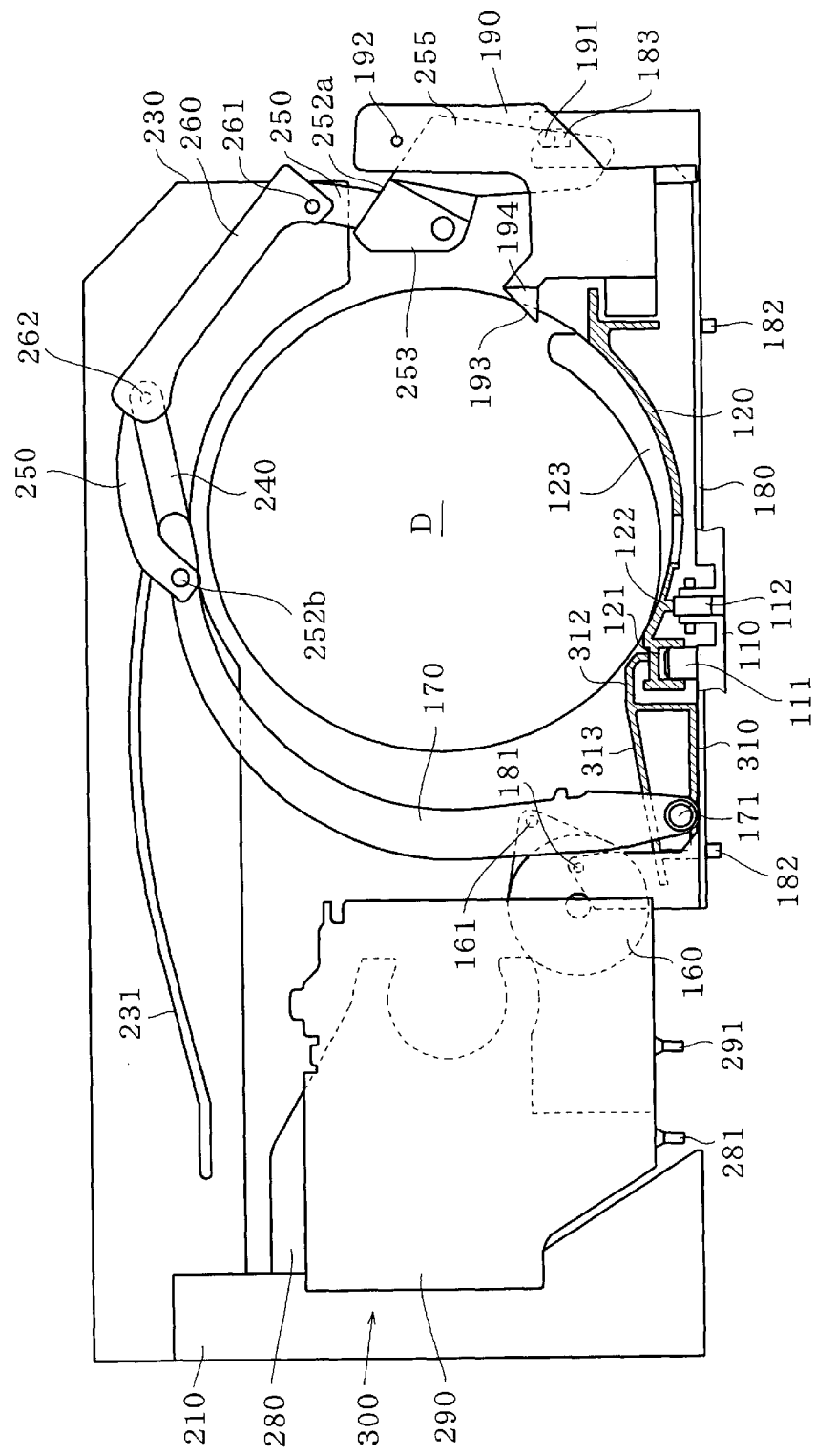
Figure 20:
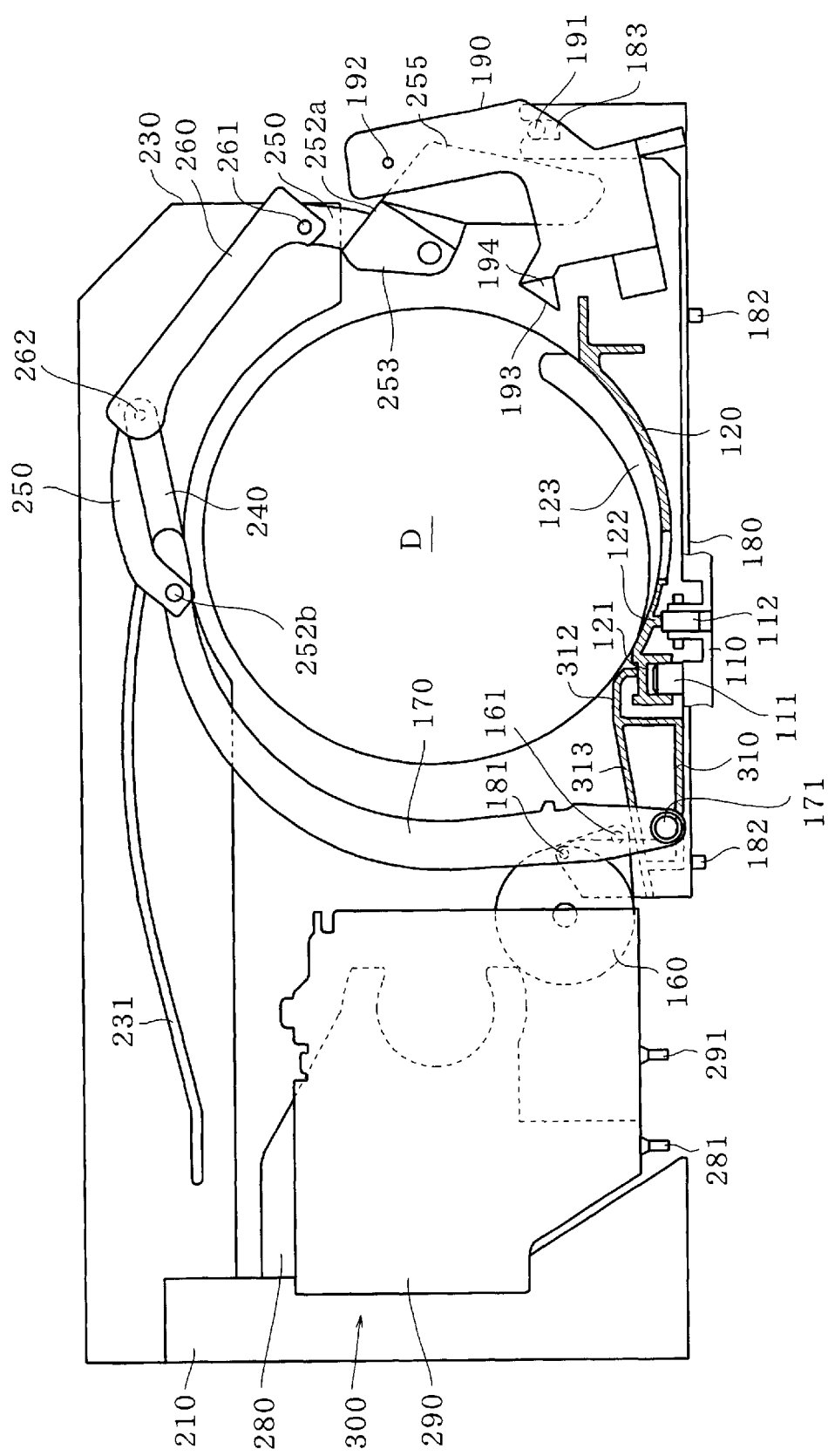
Figure 21:
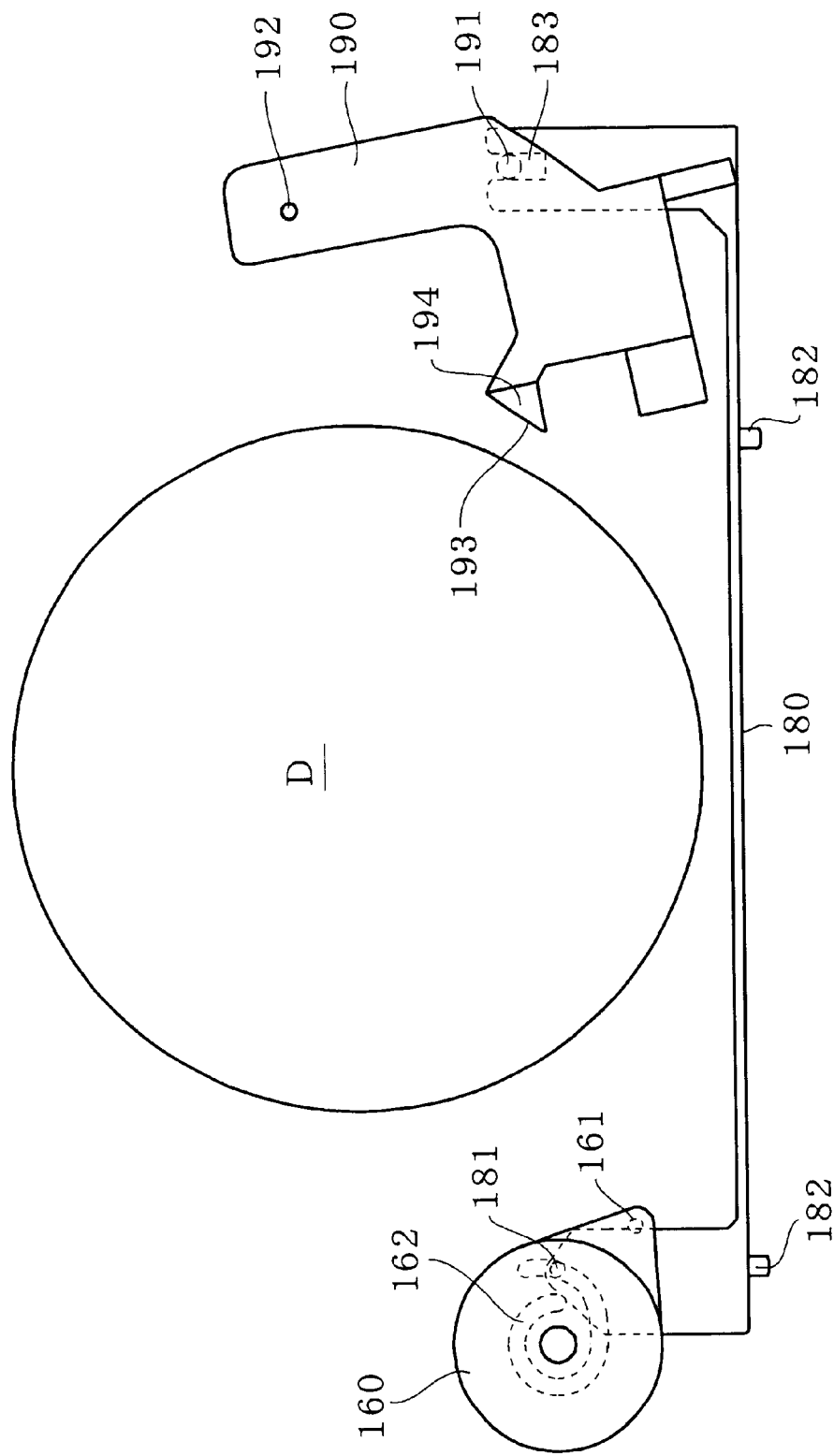
Figure 22:
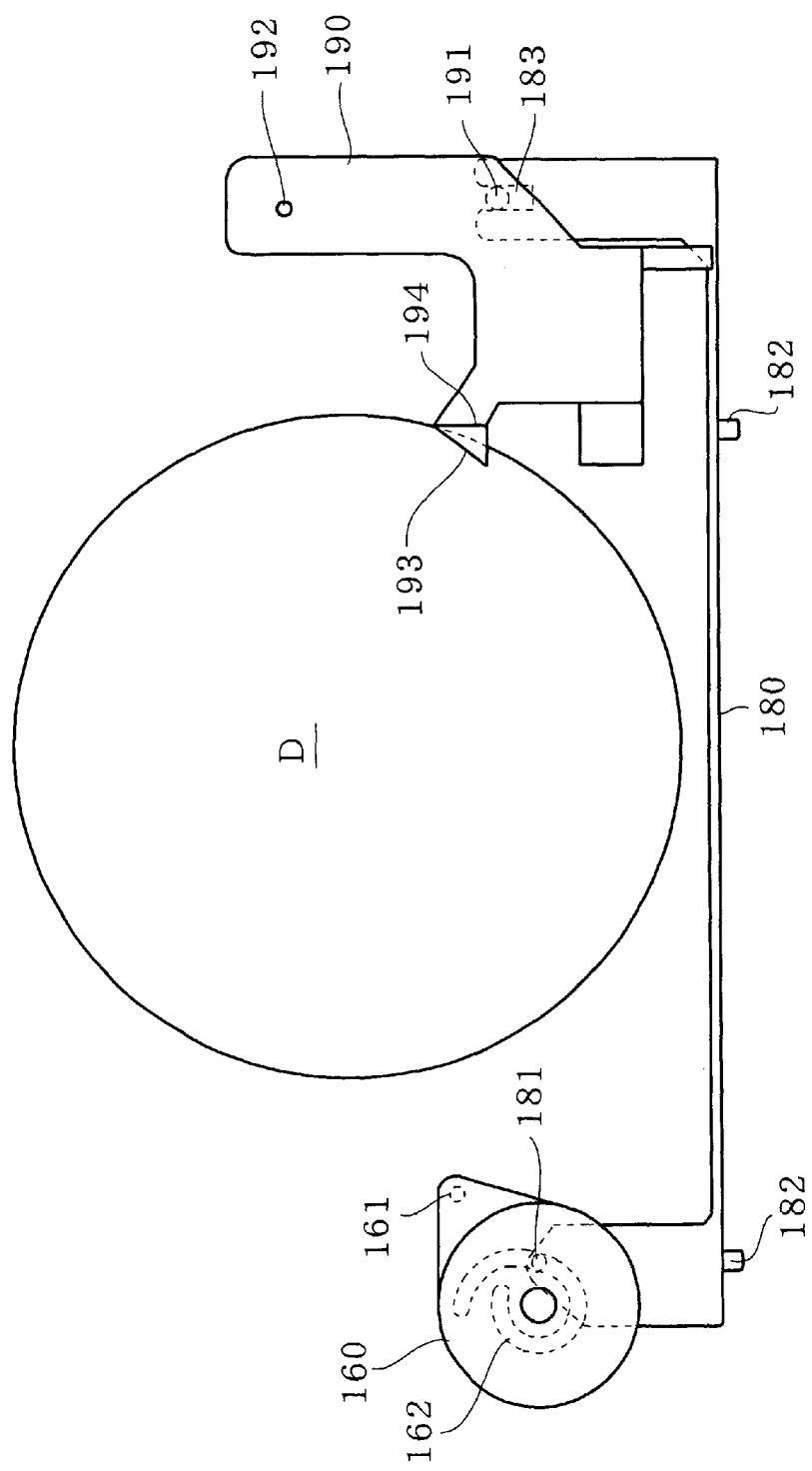

The disc D is moved toward the disc holder 120, and the guide portion 255 is inserted in the groove 195 of the pressure plate 190 (FIG. 19). Thus, the carrying arm 250 is ensurely positioned.

As shown in FIG. 19, the disc D is inserted in the space between the partition plates 123 from the position having the largest width and the highest height at the outermost periphery of the disc holder 120. Therefore, the disc D is exactly entered in the desired space. Thereafter, the disc D is gradually inserted in the space toward the space having the smallest width and the lowest height. Thus, the disc D is exactly returned to the disc holder 120.

When the disc returns to the disc holder 120, the engaging portions 252a and 252b are removed from the periphery of the disc, and the operation of the carrying arm 250 stops.

The slide plate 180 is moved to the right by the cam 160. The movement of the slide plate 180 causes the pressure plate 190 to rotate in the counterclockwise direction by the engagement of the pin 191 with the groove 183, so that the pressure plate 190 is removed from the discs D and D' and from the disc holder 120 to release the disc holder. Finally motor 151 stops to complete the reproduction of the disc D.

As a modification, the annular groove may be provided in the rack base 110, and projections 111 may be mounted on the underside of the disc holder 120.

Figure 6:
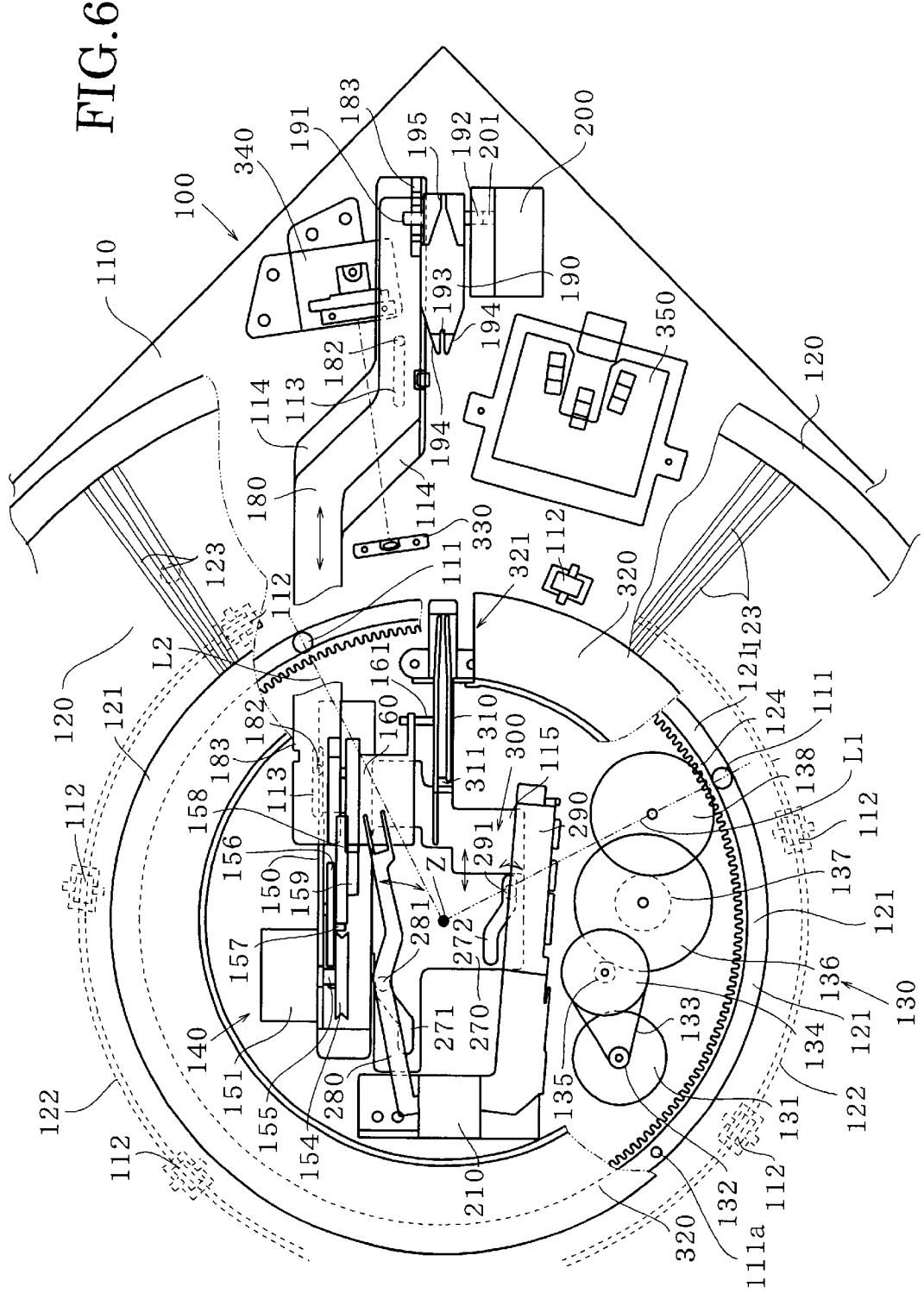
FIG. 6 is a plan view of showing a part of a device of a second embodiment of the present invention.
Figure 7:
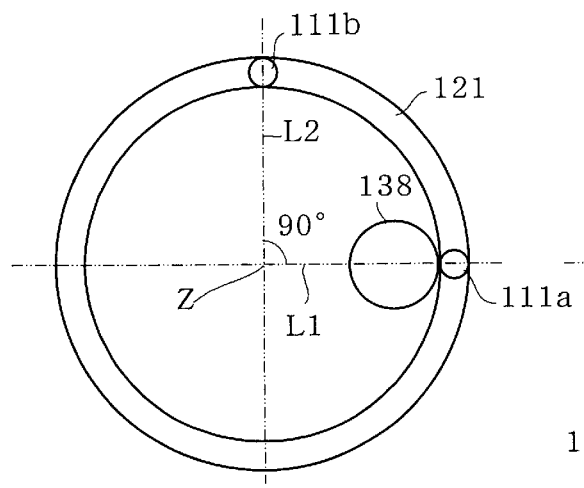
FIGS. 7*a* to 7*e* show examples of disposition of projections.
Figure 7:
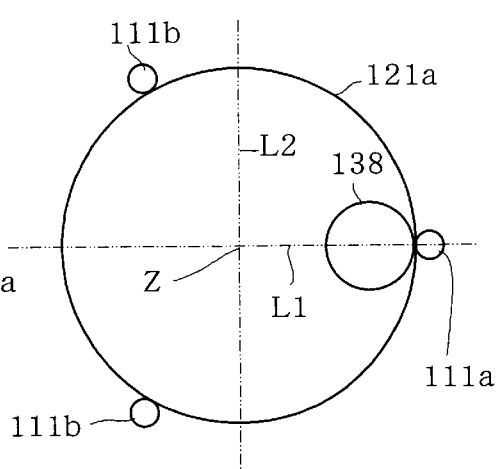
Figure 7:
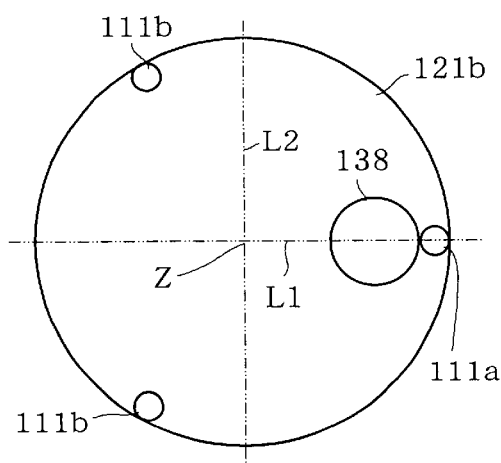
Figure 7:
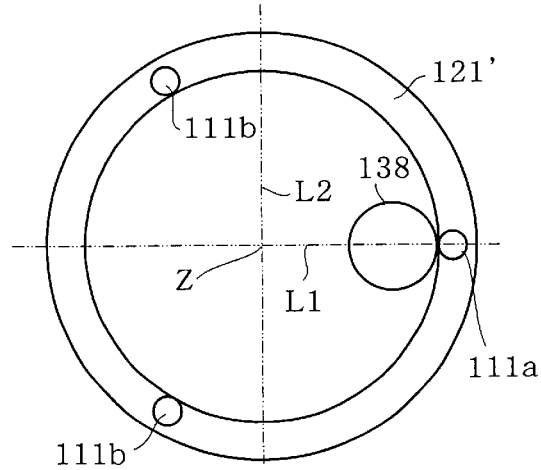
Figure 7:
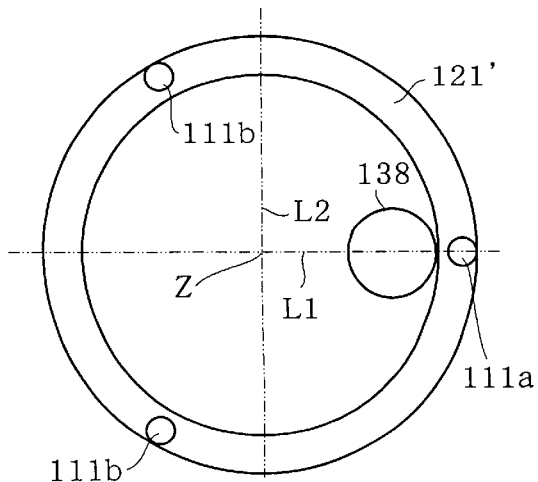
Figure 8:
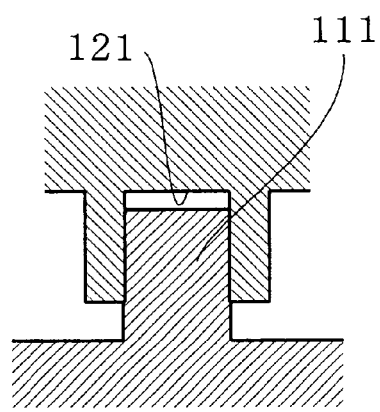
FIGS. 8*a* and 8*b* show examples of projections.
Figure 8:
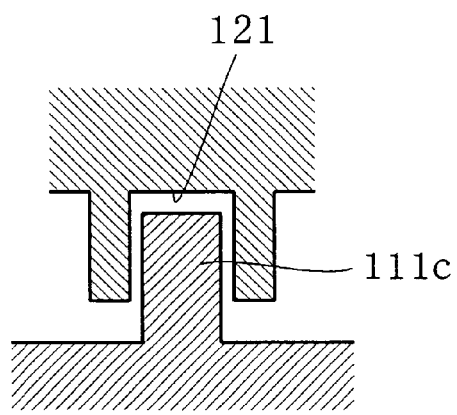

FIGS. 6 to 8 show the second embodiment of the present invention.

Referring to FIG. 6, a projection 111a is disposed on a line L1 connecting the axis Z and the center of the gear 138 engaging with the rack 124 formed on the inside periphery of the disc holder 120. Another projection 111b is disposed on a line L2 making an angle of 90 degrees with the line L1 (FIG. 7a).

Thus, the XY position of the disc holder 120 is determined by the engagement between projections 111a, 111b and the groove 121 with the necessary minimum member of parts.

Even if the annular groove 121 becomes defective in circularity because of change with time or change of ambient temperature, the projections are not deformed by providing only two projections, thereby ensuring the engagement there-between.

As shown in FIG. 7b, two or more projections 111b may be provided.

Referring to FIG. 8b, a protecting projection 111c may further be provided. The projection 111c does not contact with the inside wall of the groove 121, and contact therewith when the case 100 is vibrated to protect the disc holder 120.

In the example of FIG. 7b, a circular outside wall 121a is formed about the axis, and three projections engage with the outside wall. Furthermore, as shown in FIG. 7c, the projections may be contacted with an inside wall 121b.

In the example of FIG. 7d, an annular groove 121' has a larger width them the diameter of the projection 111, and the projections engage with the inner wall of the groove 121'.

In the example of FIG. 7e, the projections 111 engage with the outer wall.

In accordance with the present invention a circular guide means is provided for rotatably support the disc holder. Therefore, the disc holder can be rotated without providing a rotating shaft. As a result, it is not necessary to provide a device for preventing the vibration of the shaft.

While the invention has been described in conjunction with preferred specific embodiment thereof, it will be understood that this description is intended to illustrate and not limit the scope of the invention, which is defined by the following claims.

What is claimed is:

1. A disc reproducing device comprising:

a housing having a rack base;

a disc holder provided within the housing, the disc holder holding a plurality of discs and being rotatable about a virtual axis within the housing;

supporting means for rotatably mounting the disc holder on the rack base of the housing;

rotating means for rotating the disc holder to move a selected disc to a predetermined position;

a reproducing device which reproduces the selected disc;

carrying means for carrying the selected disc from the disc holder to the reproducing device;

an annular groove and at least two projections which project perpendicular to the rack base and engage the annular groove to rotatably support the disc holder, which is rotatable via the annular groove and the at least two projections;

wherein the at least two projections are provided on either one of the rack base and an underside of the disc holder; and wherein the annular groove is provided on the other one of the rack base and the underside of the disc holder.

2. The disc reproducing system according to claim 1, wherein the at least two projections are substantially cylindrical solid members.

3. The disc reproducing system according to claim 1, wherein the at least two projections are provided in a vicinity of a connecting section between the disc holder and the rotating means.

4. The disc reproducing system according to claim 3, wherein the connecting section is an engaging section where a rack provided on the disc holder engages a gear provided on the rotating means.

5. The disc reproducing system according to claim 1, wherein the at least two projections are arranged wherein an angle of approximately 90 degrees is formed between two straight lines connected between the at least two projections and the virtual axis.

6. The disc reproducing system according to claim 1, wherein positions of the at least two projections and a radius of the annular groove define the virtual axis.

7. The disc reproducing system according to claim 1, wherein any axis portion for rotating the disc holder is unnecessary because of the at least two projections and the annular groove.

* * * * *